US012361355B2

(12) United States Patent
Evensen et al.

(10) Patent No.: US 12,361,355 B2
(45) Date of Patent: Jul. 15, 2025

(54) DRILLING SYSTEMS AND METHODS

(71) Applicant: MHWIRTH AS, Kristiansand (NO)

(72) Inventors: Kim Andre Evensen, Bjorbekk (NO); Soeren Oeydna, Kristiansand (NO)

(73) Assignee: MHWIRTH AS, Kristiansand (NO)

( * ) Notice: Subject to any disclaimer, the term of this patent is extended or adjusted under 35 U.S.C. 154(b) by 493 days.

(21) Appl. No.: 17/913,438

(22) PCT Filed: Mar. 23, 2021

(86) PCT No.: PCT/NO2021/050075
§ 371 (c)(1),
(2) Date: Sep. 22, 2022

(87) PCT Pub. No.: WO2021/194349
PCT Pub. Date: Sep. 30, 2021

(65) Prior Publication Data
US 2023/0125627 A1  Apr. 27, 2023

(30) Foreign Application Priority Data

Mar. 24, 2020 (GB) .................................. 2004219

(51) Int. Cl.
*G06Q 10/0631* (2023.01)
*E21B 44/00* (2006.01)
(52) U.S. Cl.
CPC ....... *G06Q 10/06316* (2013.01); *E21B 44/00* (2013.01)
(58) Field of Classification Search
CPC ........................... G06Q 10/06316; E21B 44/00
See application file for complete search history.

(56) References Cited

U.S. PATENT DOCUMENTS

| 8,397,837 | B2 | 3/2013 | Skogerbø |
| 10,310,896 | B1 * | 6/2019 | Kichak ................. G06F 9/4843 |

(Continued)

FOREIGN PATENT DOCUMENTS

| WO | WO 2010/101473 A1 | 9/2010 |
| WO | WO 2013/082498 A2 | 6/2013 |

(Continued)

OTHER PUBLICATIONS

F. Iversen et al.: "Demonstrating a New System for Integrated Drilling Control", AADE, pp. 1-9 (2007).

(Continued)

*Primary Examiner* — Gary Collins
(74) *Attorney, Agent, or Firm* — Norman B. Thot

(57) ABSTRACT

An integrated well construction system for constructing a well includes equipment controllers which control drilling equipment, and a process controller operatively connected to the equipment controllers. The process controller includes a drilling control module which defines an operational drilling scheme and a task manager module. The operational drilling scheme has a first part to control the drilling equipment, a second part with manual tasks and/or automated tasks to be performed, and a relation between an execution of control of the drilling equipment via the first plan and of manual tasks and/or the automated tasks via the second plan. The task manager module has a user interface, a task refinement component which updates the second part, and a user interaction device which provides a manual addition of new manual tasks and/or new automated tasks, and a removal or amendment of at least one of the manual tasks and/or the automated tasks.

26 Claims, 11 Drawing Sheets

(56) References Cited

U.S. PATENT DOCUMENTS

| | | |
|---|---|---|
| 2012/0059521 A1 | 3/2012 | Iversen et al. |
| 2015/0112488 A1 | 4/2015 | Hoehn et al. |
| 2015/0330204 A1 | 11/2015 | Hildebrand et al. |
| 2019/0242219 A1 | 8/2019 | Valleru et al. |
| 2020/0080412 A1 | 3/2020 | Johnsen et al. |
| 2021/0002995 A1 | 1/2021 | Botnan et al. |

FOREIGN PATENT DOCUMENTS

| | | |
|---|---|---|
| WO | WO 2018/203753 A1 | 11/2018 |
| WO | WO 2019/173841 A1 | 9/2019 |

OTHER PUBLICATIONS

T. Pink et al.: "Building an Automated Drilling System Where Surface Machines arc Controlled by Downhole and Surface Data to Optimize the Well Construction Process", SPE International, IADC/SPE 150973, pp. 1-9 (2012).

\* cited by examiner

| Overview | | Plans | Archive | Task overview | | | | |
|---|---|---|---|---|---|---|---|---|
| JAN 2020 | | FEB 2020 | | | MAR 2020 | | | |
| Section | | Detailed Plan | Signed | Completed | DOP 6 Run 20 inch casing | | | |
| P Pre | | | | | ▶ Well information | ▶ Major operational risks | | ▶ Objective |
| D 36 | | DOP 1 Drill 36 inch section. | ☑ | ☑ | Perform … | Stringers: … | | Perform … |
| | | DOP 2 Run 30 inch conductor. | ☑ | ☑ | Drill … | Slow progress … | | Drill … |
| | | DOP 3 Cement 30 inch conductor. | ☑ | ☑ | Find the "bottleneck" … | Hole cleaning | | Find … |
| D 24 | | DOP 4 Cut conductor. | ☑ | ☑ | ▶ Limitations | ▶ HSE Risks | | ▶ Golden questions |
| | | DOP 5 Drill 24 inch section | ☑ | ☑ | Min/max flow: … | Red zones | | Can it be eliminated? |
| | | DOP 6 Run 20 inch casing | ☐ | ☐ | ID restrictions… | Handling of…… | | Can it be done in parallel? |
| | | DOP 7 Cement 20 inch casing | ☐ | ☐ | Possible "bottlenecks" … | Use of …… | | Can it be more efficient? |
| D 17 | | DOP 8 Drill 17 inch section | ☐ | ☐ | ▶ Technical | ▶ Critical depths | | Can it be more consistent? |
| | | DOP 9 Cement 17 inch section | | ☐ | Max pull:… | TOP of BOP: | | |
| | | | | | ID: …… | | | Details |
| | | | | | Max drilling torque … | | | |

Fig. 10

DRILLING SYSTEMS AND METHODS

CROSS REFERENCE TO PRIOR APPLICATIONS

This application is a U.S. National Phase application under 35 U.S.C. § 371 of International Application No. PCT/NO2021/050075, filed on Mar. 23, 2021 and which claims benefit to Great Britain Patent Application No. 2004219.8, filed on Mar. 24, 2020. The International Application was published in English on Sep. 30, 2021 as WO 2021/194349 A1 under PCT Article 21(2).

FIELD

The present disclosure relates to drilling systems and methods, including but not limited to systems and methods for operating offshore drilling rigs and associated equipment.

BACKGROUND

In drilling operations, such as offshore petroleum exploration, various operations are usually carried out by highly specialized vessels or rigs. The operation of such vessels or rigs can be very costly and make up a substantial part of the cost of a well. Due to the high cost, operational efficiency and reliability during these processes is of great importance.

Moreover, as regulatory requirements become ever-more stringent, while, for example, petroleum exploration takes place in more challenging areas (such as deepwater fields or arctic areas), safety is also a key issue among most stakeholders in the relevant industries. For example, controlling the relevant process variables within certain margins is crucial in petroleum drilling operations in order to maintain the stability of the formation, avoid loss of drilling fluid (commonly known as mud), and avoiding uncontrolled influx of reservoir fluids into the wellbore.

Documents which may be useful for understanding the background include U.S. Pat. No. 8,397,837; WO 2010/101473; WO 2018/203753, and WO 2013/082498.

There is consequently a continuous need for improved systems and techniques for operating drilling plants efficiently, while maintaining a high level of safety.

SUMMARY

An aspect of the present invention is to provide drilling systems and methods which can realize advantages over known solutions and techniques in the above-mentioned or other areas.

In an embodiment, the present invention provides an integrated well construction system operable for constructing a well. The integrated well construction system includes a plurality of equipment controllers each of which are operable to control an operation of at least one drilling equipment, and a process controller which is operatively connected to the plurality of equipment controllers. The process controller comprises a drilling control module which is arranged to define an operational scheme for drilling in accordance with a pre-determined well plan, and a task manager module. The operational scheme for drilling comprises a first part for control of the at least one drilling equipment, a second part comprising manual tasks and/or automated tasks, each of which are automatically generated, to be performed, and a relation between an execution of control of the at least one drilling equipment according to the first plan and an execution of the manual tasks and/or the automated tasks according to the second plan. The task manager module comprises a user interface which is arranged to visualize the manual tasks and/or the automated tasks and to receive a user input, the automated tasks being visualized, a task refinement component which updates the second part of the operational scheme for drilling, and a user interaction device. The user interaction device is configured to provide at least one of a manual addition of new manual tasks and/or new automated tasks, a removal of at least one of the manual tasks and/or the automated tasks each of which are automatically generated, and an amendment of at least one of the manual tasks and/or the automated tasks each of which are automatically generated

BRIEF DESCRIPTION OF DRAWINGS

The present invention is described in greater detail below on the basis of embodiments and of the drawings in which:

FIG. 10 is an example of a third user interface view for initiating an integrated well construction system operable for constructing a well;

DETAILED DESCRIPTION

Figure 1:
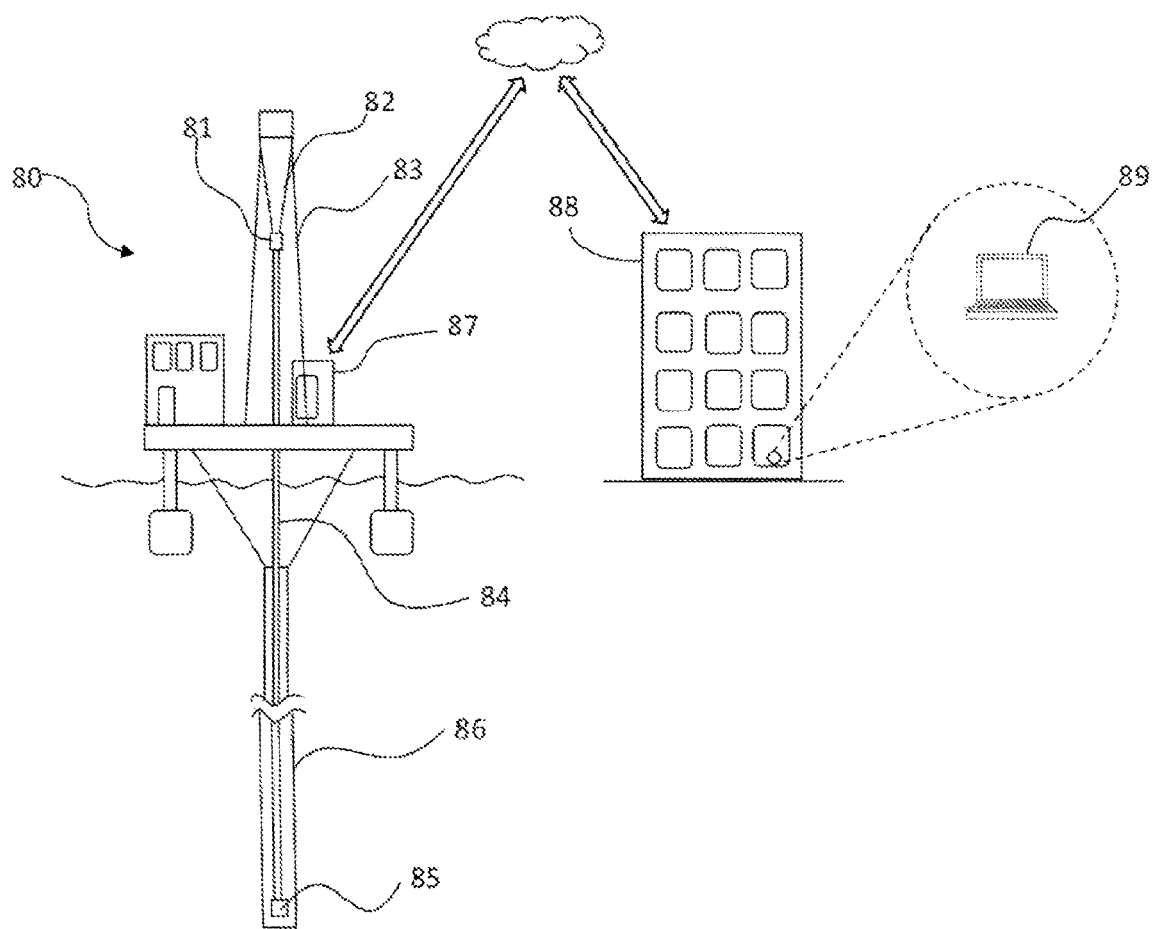
FIG. 1 is a schematic illustration of an example of a drilling vessel.

The present disclosure relates to an integrated well construction system operable for constructing a well. The integrated well construction system comprises a plurality of equipment controllers which are each operable to control the operation of at least one drilling equipment, and a process controller which is operatively connected to the plurality of equipment controllers. The process controller comprises a drilling control module arranged to define an operational scheme for drilling in accordance with a pre-determined well plan. The operational scheme for drilling comprises a first part for control of the drilling equipment, a second part comprising automatically generated manual and/or automated tasks to be carried out and a relation between execution of control of the drilling equipment according to the first plan and execution of manual and/or automated tasks according to the second plan. The process controller comprises further a task manager module comprising a user interface arranged to visualize manual and/or automated tasks and receive user input, the task manager module comprising a task refinement component for updating the second part of the operational scheme, wherein the generated automated tasks are visualized and wherein the user interaction device allows for manually adding new manual and/or automated tasks and/or for removal of at least one of the automatically generated manual and/or automated tasks and/or for amendment of at least one of the automatically generated manual and/or automated tasks.

Handling of automated and/or manual tasks associated to the drilling are thereby integrated in the system.

The present disclosure further relates to a computer-implemented method for initiating an integrated well construction system operable for constructing a well. The method comprises obtaining well plan data;

determining an operational scheme for drilling in accordance with the well plan data, the operational scheme for drilling comprising a first part for control of drilling equipment, a second part comprising automatically generated manual and/or automated tasks to be carried out and a relation between execution of control of the drilling equipment according to the first plan and execution of manual and/or automated tasks according to the second plan;

visualizing, via a user interface, the generated manual and/or automated tasks; and allowing for manual task refinement, using user interaction device, for manually adding new manual and/or automated tasks and/or for manual removal of at least one of the manual and/or automated tasks and/or for amendment of at least one of the manual and/or automated tasks, wherein the user can confirm that the operational scheme is acceptable via the user interaction device.

In an option, the method further comprises a step of further comprising a step of transmitting to at least one remote electronic user device at least a subset of the, for example, confirmed manual and/or automated tasks.

The present disclosure further relates to a computer-implemented method for operating an integrated well construction system operable for constructing a well. The method comprises obtaining an operational scheme for drilling in accordance with well plan data, the operational scheme for drilling comprising a first part for control of drilling equipment, a second part comprising automatically generated and possibly manually refined manual and/or automated tasks to be carried out and a relation between execution of control of the drilling automation modules according to the first plan and execution of manual and/or automated tasks according to the second plan; and controlling the drilling equipment in accordance with the first part while repeatedly determining whether the execution of manual and/or automated tasks according to the second plan is timely executed according to the relation between execution of control of the drilling equipment according to the first plan and execution of manual and/or automated tasks according to the second plan.

The present disclosure further relates to a control system for an integrated well construction system operable for constructing a well. The control system comprises a drilling control module arranged to communicate with a at least one drilling automation module and/or at least one drilling equipment, the drilling control module being arranged to define an operational scheme for drilling in accordance with a pre-determined well plan. The operational scheme for drilling comprises a first part for control of the drilling automation module(s) and/or drilling equipment(s), a second part comprising automatically generated manual and/or automated tasks to be carried out and a relation between execution of control of the drilling automation modules according to the first plan and execution of manual and/or automated tasks according to the second plan. The control system comprises further a task manager module comprising a user interface arranged to visualize manual and/or automated tasks and receive user input, the task manager module comprising a task refinement component for updating the second part of the operational scheme, wherein the generated automated tasks are visualized and wherein the user interaction device allows for manually adding new manual and/or automated tasks and/or for removal of at least one of the automatically generated manual and/or automated tasks and/or for amendment of at least one of the automatically generated manual and/or automated tasks.

FIG. 1 illustrates schematically a drilling vessel 80. In the illustrated example, the drilling vessel 80 operates using a top drive 81, a hoisting system 82 operating the top drive 81 in a rig structure 83 to suspend a drill string 84 having a drill bit 85 into a subterranean wellbore 86.

An integrated well construction system as disclosed herein is used for at least partly controlling operation of the drilling vessel. Parts of a control system of the integrated well construction system, such as drilling automation modules and/or user interface(s) 50,51 and/or the process controller may be arranged in a driller's cabin 87 on the vessel 80.

An external system is in the illustrated example arranged in a shore-based location, here illustrated as office 88. The external system comprises a computer 89 located at the office 88. The computer 89 may be in bi-directional communication with the drilling system via a data link, which is illustrated in FIG. 1 with the double arrows and an intermediate "cloud" storage, however, the data link may be a direct link between the vessel 80 and the office 88. The data link may be a substantially real-time data link, or it may be set up to provide repeated, intermittent communication of relevant data.

The control system of the integrated well construction system may operatively connected to the external system. Thereby, for example, the control system and/or drilling automation module(s) thereof may be arranged to set limitations sent to the limitations application based at least partly on limitations provided by the external system. The limitations provided by the external system may be a function of operational data, such as sensor data from the integrated well configuration system.

The control system of the integrated well construction system has in accordance with this disclosure access to a well plan, either stored locally at the control system of the vessel or by the external system, or a combination thereof. The set limitations is a function of the well plan and operational data.

The external system or local control system or a combination thereof may be configured to repeatedly update the well plan in response to operational data received from at least one of sensors, user interfaces and interfaces to external devices. The external system may be arranged at an onshore location or offshore location.

The computer may be operable to provide limitations to a limitations application. The computer 89 may comprise the well plan, and the limitations set by the computer 89 can be a function of the well plan and the (real-time or historical) operational data received from at least one of a drilling parameter sensor(s), drilling automation module(s), a process controller or equipment controller(s). Advantageously, this may provide enhanced operational safety, in that the limitations to be calculated with better accuracy. For example, the personnel in the office 88 may include a geologist (not normally present on the vessel 80) or have access to better geological models of the formation into which the well bore 86 is being drilling which is not available to the driller. This geologist or the geological model might, for example, suggest that the drill bit 85 will shortly be entering a part of the formation which contains fluid at a higher pressure than previously. In such a case, it may be advantageous to set an automated sequence executed by the drilling system with an increased fluid pressure in the well bore 86 in order to minimize the risk of a blowout. Similarly, for example, during automated tripping operations, limitations on the tripping speed in different sections of the wellbore 86 may be imposed from the office 88 in order to avoid damaging the formation.

In any of the embodiments described here, the computer 89 may be configured to repeatedly update the well plan in response to operational data received from at least one of the drilling parameter sensor(s), the drilling automation module(s), the process controller or the equipment controller(s).

Both the remote external system (in this embodiment, the computer 89) and any local external system on the rig may be operable to set limitations for the limitations application. Alternatively, or additionally, the remote external system and one or more of the drilling automation modules may operate to set limitations for the limitations application simultaneously. In the event that two or more limitations exist (e.g., two or more "operating envelopes" for a given machine), then ordinarily the drilling system should be so configured as to apply the narrowest operating envelope.

Some embodiments may thus allow limitations to automated sequences to be applied on the drilling process based on best possible information. For example, a combination of limitations from the computer 89, based on a continuously updated well plan, and limitations from an early kick detection (EKD) drilling automation module could provide a fast response in the event of a blow-out risk, as well as an optimization of the drilling processes based on the well plan and reservoir models.

It is a complex task operating drilling plants efficiently, while maintaining a high level of safety.

Figure 2:
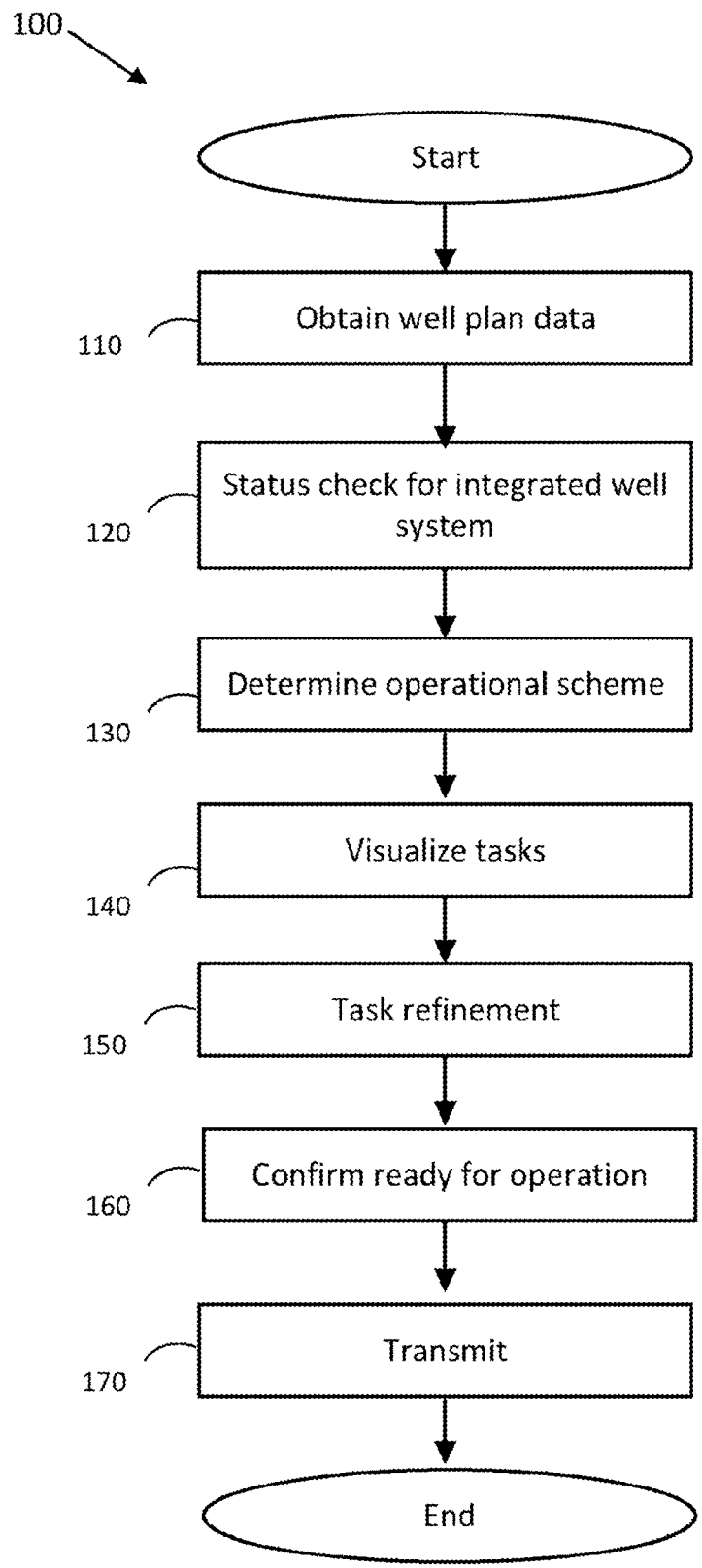
FIG. 2 is a flow chart illustrating an example of a method for initiating an integrated well construction system operable for constructing a well.

FIG. 2 illustrates a method 100 for initiating an integrated well construction system operable for constructing a well. The method is computer-implemented. The computer implemented method provides support for coordination to enable operating drilling plants efficiently, while maintaining a high level of safety.

The method comprises a step of obtaining 110 well plan data. A well plan is a detailed statement of a proposed wellbore which includes a wide range of information pertaining to the well which is supposed to be drilled or already in use. The plan is an important part of the well planning phase, wherein a wellbore may be studied and analyzed in detail. The data incorporated in the well plan may include type, orientation, shape, location, completion and other evaluations. A wellbore can be either vertical or horizontal; each well must therefore be planned precisely and according to the certain factors that aid in optimized production.

To sum up, the management of equipment on the drilling rig and in the well is performed in the context of working processes, such as drilling, running in or running out. The processes are planned in well plans that list each step of the processes, including, for example a sequence of tubulars that are going into the well.

The method 100 may further comprise a step of determining 120 a status of the integrated well system.

The method further comprises a step of determining 130 an operational scheme for drilling in accordance with the well plan data. The operational scheme for drilling is determined 130 based on the received well plan data and when determined, based on the status of the integrated well system. The status may comprise a status of operational parameters such as:

state parameters from the well;
a status of automated/manual tasks such as material supply; and
a status of drilling equipment.

The operational scheme for drilling comprises:

a first part for control of drilling equipment;
a second part comprising automatically generated manual and/or automated tasks to be carried out; and
a relation between execution of control of the drilling automation modules according to the first plan and execution of manual and/or automated tasks according to the second plan.

The method further comprises a step of visualizing 140, via an operator's interface, the generated manual and/or automated tasks.

The method further comprises allowing for manual task refinement 150, using the user interface, for manually adding new manual and/or automated tasks and/or for manual removal of at least one of the manual and/or automated tasks and/or for amendment of at least one of the manual and/or automated tasks.

In accordance with the method, the user can confirm 160 that the operational scheme is acceptable via the user interface.

In an example, the computer-implemented method further comprises a step of transmitting 170 to at least one remote electronic user device at least a subset of the, for example, confirmed manual and/or automated tasks.

In FIGS. 10-14, an example will be illustrated of a user interface for initiating an integrated well construction system operable for constructing a well.

Figure 3:
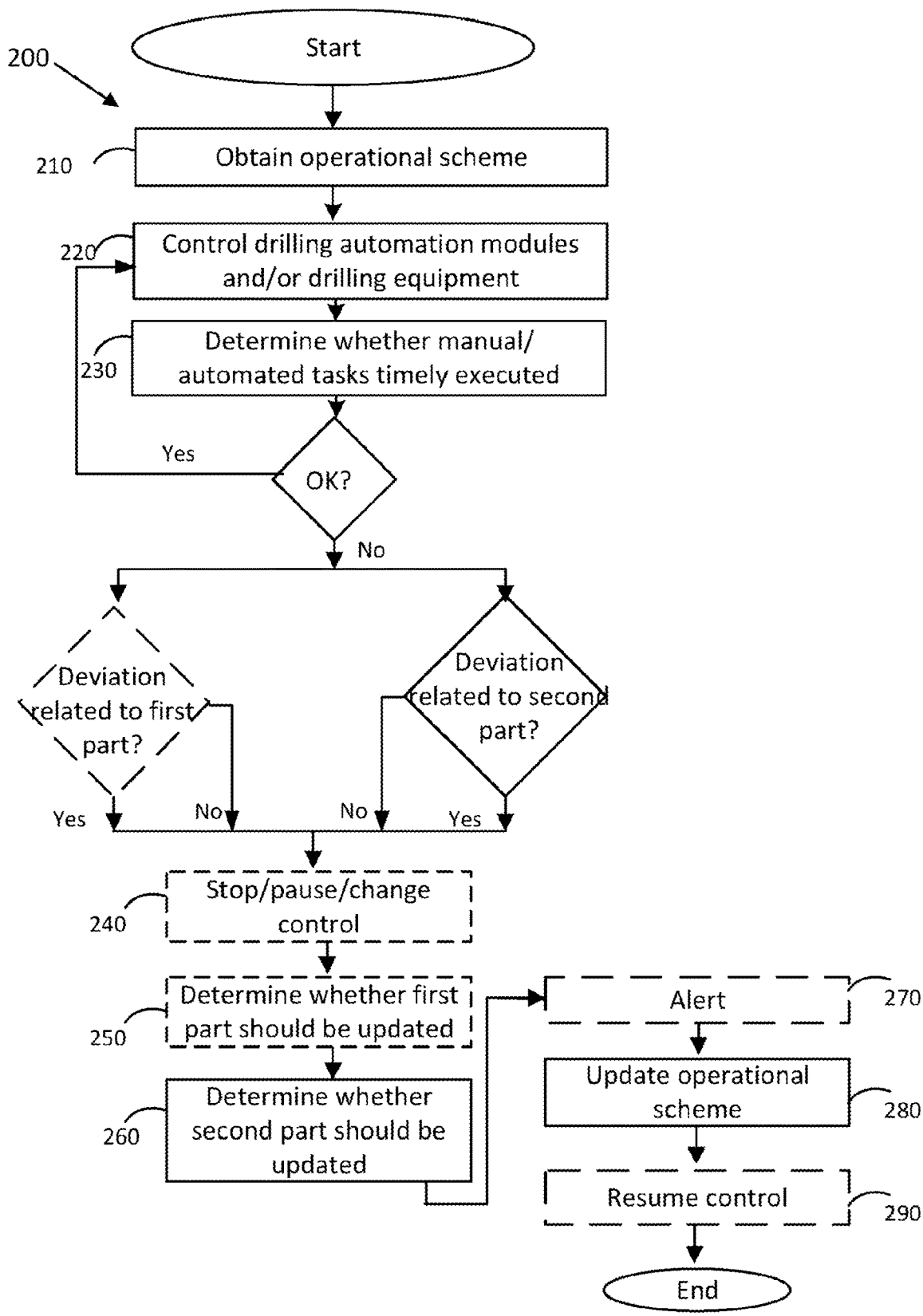
FIG. 3 is a flow chart illustrating an example of a method for operating an integrated well construction system operable for constructing a well.

FIG. 3 illustrates a method 200 for operating an integrated well construction system operable for constructing a well. The method is computer implemented.

The method comprises a step of obtaining 210 an operational scheme for drilling in accordance with well plan data. The operational scheme for drilling comprises a first part for control of drilling equipment, a second part comprising automatically generated and possibly manually refined manual and/or automated tasks to be carried out, and a relation between execution of control of the drilling automation modules according to the first plan and execution of manual and/or automated tasks according to the second plan.

The method further comprises a step of controlling 220 the drilling equipment in accordance with the first part while repeatedly determining 230 whether the execution of manual and/or automated tasks according to the second plan is timely executed according to the relation between execution of control of the drilling equipment according to the first plan and execution of manual and/or automated tasks according to the second plan.

The determination 230 of whether the execution of manual and/or automated tasks according to the second plan is timely executed according to the relation between execution of control of the drilling equipment according to the first plan and execution of manual and/or automated tasks according to the second plan comprises indifferent examples monitoring operational data comprising at least one of state parameters from the well, a status of execution of manual and/or automated tasks and a status of drilling equipment, and determining whether the operational data is outside predetermined boundaries.

Operational data is thus monitored during drilling. The operational data may comprise sensor data obtained from sensors monitoring the operation. The operation data may also comprise data obtained via at least one operator's interface. Further, the operational data may comprise data received from external devices.

The operational data relates to automated/manual tasks such as material supply. The operational data may also relate to state parameters from the well, and/or status of drilling equipment.

When the operational data is outside predetermined boundaries, the first part for control of drilling equipment and/or the second part for at least one of the manual and/or automated tasks to be carried out may be updated When the operational data is outside predetermined boundaries, i.e., when it has been determined that the execution of manual and/or automated tasks according to the second plan is not timely executed according to the relation between execution of control of the drilling equipment according to the first plan and execution of manual and/or automated tasks according to the second plan, the method may further comprise determining 260 whether any of the manual and/or automated tasks of the second part of the operational scheme should be updated.

This may comprise monitoring execution of the automated/manual tasks. If it is determined that the automated/manual tasks of the second part are not executed timely, it may be determined that the second part of the operational scheme should be updated. Further, the determination of whether the second part of the operational scheme comprising manual/automated tasks should be updated may comprise monitoring the state parameters from the well and/or the status of the drilling equipment. If it is determined that drilling according to the operational scheme is not possible based on the values of the state parameters from the well and/or based on the status of the drilling equipment, it may be determined that the second part of the operational scheme is, for example, updated.

When determined that a manual or automated task should be updated, the second part of the operational scheme is updated 280 accordingly. The updating 280 of the second part of the operational scheme may be performed automatically.

The updating 280 of the second part of the operational scheme may instead comprise:

providing a suggested update or recommending update of manual and/or automated tasks; and receiving via the user interface user input regarding updates of the second part of the operational scheme including added new manual and/or automated tasks and/or removal of at least one of the automatically generated manual and/or automated tasks and/or amendment of at least one of the automatically generated manual and/or automated tasks.

When an update is recommended, the updating may be made manually by an operator via the operator's interface. The updates may be made manually by the operator via the operator's interface with system support. For example, as stated above, updates may be suggested via the operator's interface which the operator can accept with or without manual amendments. The updating 280 of the second part of the operational scheme may further comprise an additional step, wherein the operator confirms to execute the update as made or accepted by the operator.

Irrespective of how the manual and/or automated tasks are updated, at least the updated tasks may then be visualized via the user interface.

In accordance with the computer implemented method, when it has been determined that the execution of manual and/or automated tasks according to the second plan is not timely executed according to the relation between execution of control of the drilling equipment according to the first plan and execution of manual and/or automated tasks according to the second plan, the method may further comprise determining 250 whether the first part of the operational scheme should be updated.

This may comprise monitoring the state parameters from the well and/or the status of the drilling equipment. If it determined that drilling according to the operational scheme is not possible based on the values of the state parameters from the well and/or based on the status of the drilling equipment, it is determined that the first part of the operational scheme is not executed in accordance with plan. Based thereon, it may be determined that the operational scheme should be updated. Further, the determination 230 of whether the first part of the operational scheme for control of drilling equipment should be updated may comprise monitoring execution of the automated/manual tasks. If it is determined that the automated/manual tasks of the second part are not executed timely, it may be determined that the first part of the first part of the operational scheme should be updated in accordance with the delay.

When it has been determined that the first part of the operational scheme should be updated, the first part of the operational scheme is updated 280 accordingly. The updating 280 of the first part of the operational scheme may be performed automatically.

The updating 280 of the first part of the operational scheme may instead comprise:

providing a suggested update or recommending update of the first part; and receiving via the user interface user input regarding updates of the first part of the operational scheme.

When an update is recommended, the updating may be made manually by an operator via the operator's interface. The updates may be made manually by the operator via the operator's interface with system support. For example, as stated above, updates may be suggested via the operator's interface which the operator may accept with or without manual amendments. The updating 280 of the first part of the operational scheme may further comprise an additional step, wherein the operator confirms to execute the update as made or accepted by the operator.

Irrespectively of how the first part of the operational scheme is updated, at least the updates may then be visualized by means of the user interface.

The computer implemented method 200 may further comprise a step of stopping or pausing the drilling equipment or changing control of said drilling equipment 240 when it has been determined that the execution of manual and/or automated tasks according to the second plan is not timely executed according to the relation between execution of control of the drilling equipment according to the first plan and execution of manual and/or automated tasks according to the second plan. Operation according to the first part of the operational scheme may then be resumed when the execution of manual and/or automated tasks according to the second plan is again timely executed according to the relation between execution of control of the drilling equipment according to the first plan and execution of manual and/or automated tasks according to the second plan.

Depending on the characteristics of the deviation of the operational data and/or the type of adjustments to the operational scheme required, the steps involved in updating the operational scheme may be carried out while the drilling is still performed or while the drilling is stopped/paused. When the steps involved in updating the operational scheme are be carried out while the drilling is still performed, the drilling may be performed in accordance with the first part of the operational scheme or control may be changed to a safety mode. In the safety mode, control may, for example, be performed to drill at a reduced speed. The selection of whether control should be made according to the first part of the operational scheme or in the safety mode may also be determined based on the characteristics of the deviation of the operational data and/or the type of adjustments to the operational scheme required.

When it has been determined that the execution of manual and/or automated tasks according to the second plan is not timely executed according to the relation between execution of control of the drilling equipment according to the first plan and execution of manual and/or automated tasks according to the second plan, the method may further comprise a step of providing an alert 270 to an operator that the operational scheme is not executed in accordance with plan. The alert may comprise one or more of the following:
- An indication that the manual/automatic tasks of the second part of the operational scheme have not been executed timely.
- A reminder to execute one or more manual/automatic tasks urgently.
- A suggested refinement of the manual/automatic tasks. The suggested refinement of the manual/automatic tasks may be based on the operational data related to the first and/or second part of the operational scheme,
- An indication that the first part of the operational scheme is not executed according to plan.

Figure 4:
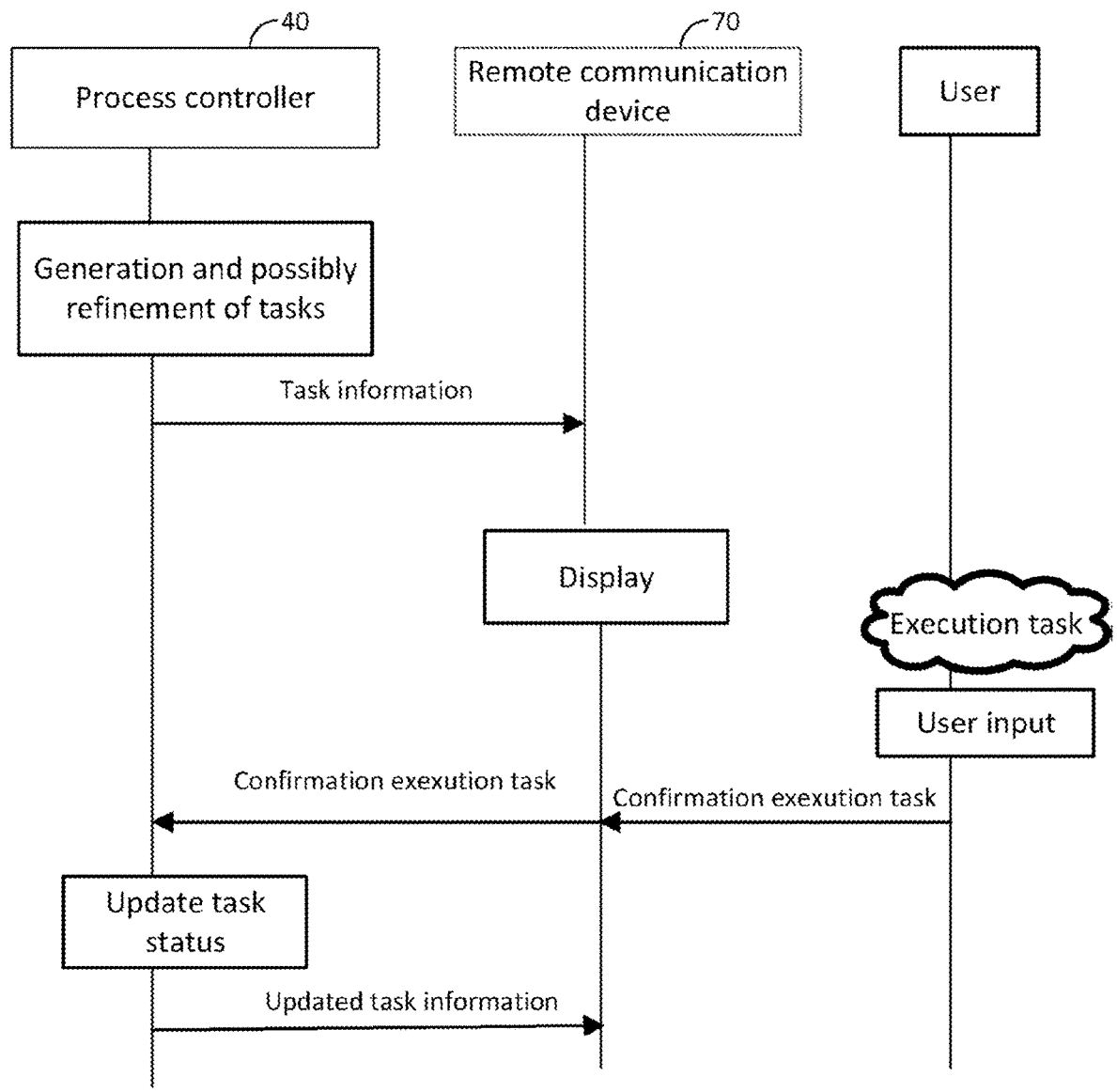
FIG. 4 is a signal scheme indicating flow of information relating to manual/automatic tasks of an operational scheme as disclosed herein.

FIG. 4 illustrates a signal scheme indicating flow of information relating to manual/automatic tasks of an operational scheme between a process controller and a remote communication device.

An operational scheme for drilling in accordance with a pre-determined well-plan is defined by a process controller 40. The operational scheme for drilling comprises a first part for control of the drilling equipment, a second part comprising automatically generated manual and/or automated tasks to be carried out, and a relation between execution of control of the drilling equipment according to the first plan and execution of manual and/or automated tasks according to the second plan.

The process controller 40 thus generates manual and/or automated task to be carried out. The manual and/or automated tasks are characteristically carried out at remote locations. The generated manual and/or automated tasks are therefore distributed to personnel and/or external devices which are intended to carry out the respective task.

The communication with the personnel and/or external devices is carried out by means of at least one remote communication device 70. The at least one remote communication device 70 may comprise at least one electronic user devices such as a tablet or a smartphone. Users may be arranged to communicate information relating to execution of manual and/or automated tasks with the process controller via the electronic user device. At least some of the communication devices may be connected to a corresponding external device arranged to perform automated tasks. Information relating to execution of automated tasks via the external device may be communicated with the process controller by the communication device.

In accordance with the signaling scheme of FIG. 4, the process controller thus communicates generated tasks to the remote communication devices. At least when the remote communication devices are electronic user devices, the remote communication devices displays at least a subset of the manual and/or automated tasks communicated from the process controller. The electronic user device comprises user interaction device for user confirmation that at least one of the displayed tasks has been carried out.

When the remote communication device is associated to an external device intended to automatically carry out the task(s), the remote communication device may instruct the external device to execute the tasks. The remote communication device is arranged to transmit a confirmation to the process controller that a task has been carried out upon determination that the task has been carried out. It may, for example, be determined that a task has been carried out by direct communication with a control element of the external device. It may, for example, be determined that a task has been carried out based on sensor data such from sensors such as image sensor(s).

When the tasks have been refined by the process controller, the process controller may transmit refined tasks to the remote communication devices. The process controller may also transmit alerts, reminders and instructions about how to carry out the tasks to the remote communication devices, especially when the remote communication devices are electronic user devices.

At least some of the manual tasks may be associated to an operator role. The subset of tasks displayed by the electronic user device may then correspond to the tasks to be carried out by a determined operator role.

A plurality of remote communication devices may thus be used, wherein different remote communication devices are associated to different tasks. For example, for a plurality of electronic user devices, each electronic user device may be arranged to display a subset of tasks to be carried out by a determined operator role.

In FIG. 4 it is illustrated that the user may confirm that a task has been executed by means of the user electronic device. The confirmation that a task has been executed is transmitted to the process controller 40. The process controller may then update the status of the tasks to be carried out in accordance with the operational scheme. The update may be visualized by means of the operator's interface. The operator therefore has complete overview of the status of the all the operations relevant when constructing a well.

The updated task information may be transmitted from the process controller to all or relevant remote communication devices.

Figure 5:
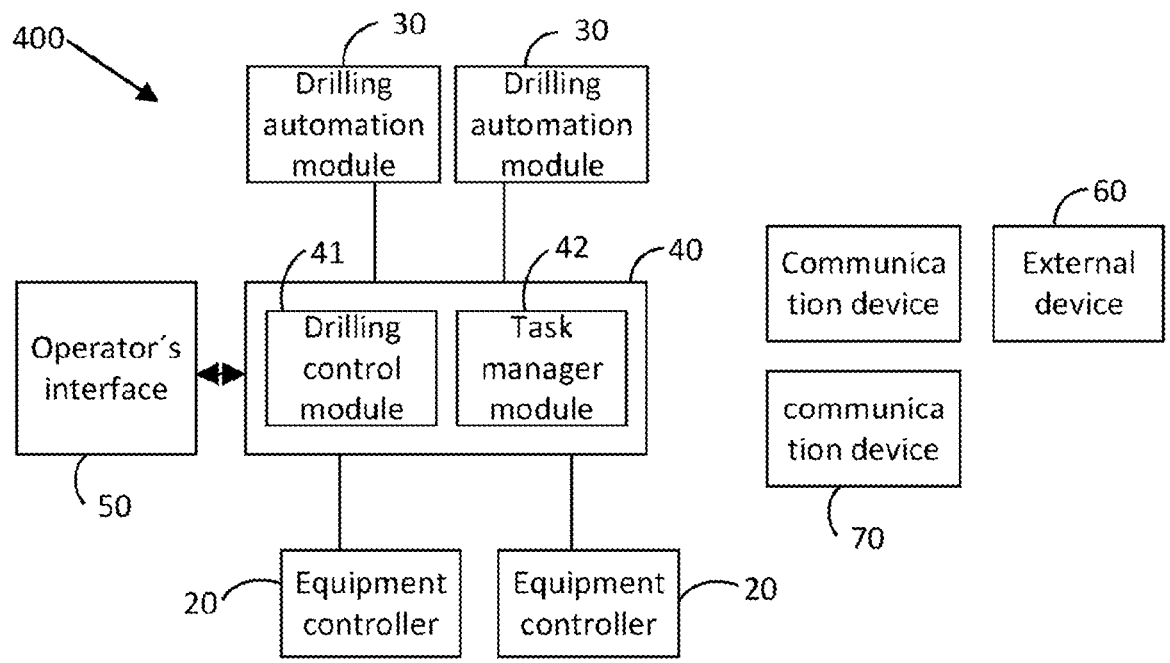
FIG. 5 is a block scheme illustrating an example of an integrated well construction system operable for constructing a well.

FIG. 5 illustrates an example of an integrated well construction system 400 operable for constructing a well. The integrated well construction system is arranged to perform at least some of the functions as illustrated in relation to FIG. 2 and/or FIG. 3 and/or FIG. 4. The integrated well construction system comprises a plurality of equipment controllers 20, which are operable to control the operation of a drilling equipment. The integrated well construction system comprises further a process controller 40, which is operatively connected to the plurality of equipment controllers 20.

The process controller 40 comprises a drilling control module 41 arranged to define an operational scheme for drilling in accordance with a pre-determined well plan. The operational scheme for drilling comprises a first part for control of the drilling equipment, a second part comprising automatically generated manual and/or automated tasks to be carried out and a relation between execution of control of the drilling equipment according to the first plan and execution of manual and/or automated tasks according to the second plan. The process controller 40 further comprises a task manager module 42. The task manager module 42 comprises a user interface arranged to visualize manual and/or automated tasks. The task manager module 42 comprises user interaction device arranged to receive user input. The task manager module comprises a task refinement component for updating the second part of the operational scheme, wherein the generated automated tasks are visualized and wherein the user interaction device allows for manually adding new manual and/or automated tasks and/or for removal of at least one of the automatically generated manual and/or automated tasks and/or for amendment of at least one of the automatically generated manual and/or automated tasks.

The process controller 40 may be arranged to obtain well plan data based on the pre-determined well plan, and determine a status of the integrated well system, wherein the operational scheme for drilling is determined based on the received well plan data and based on the determined status of the integrated well system.

The integrated well construction system 400 may further comprise at least one drilling automation module 30 in communication with the drilling control module and with one or more of the equipment controllers 20. The equipment controller is then arranged to control the operation of the drilling equipment on receipt of an operating command from an associated drilling automation module.

The process controller may be arranged to monitor operational data. The operational data may comprise at least one of a state parameter from the well, a status of execution of manual/automated tasks, and a status of the drilling equipment. When the operational data is outside predetermined boundaries, the task manager module may be caused to update at least one of the manual and/or automated tasks to be carried out and visualize the obtained manual and/or automated tasks as updated by means of an operator's interface 50.

The communication of operational data between the process controller 40 and sensors and/or user interface(s) and/or external devices, and the equipment controller 20 may use any common PLC communication method, or more advanced, certified communication methods such as OPC, UA etc.

The sensors can be any sensor operable to sense at least one drilling parameter, i.e., a physical feature of an aspect of the drilling operation, and to provide raw data regarding the drilling parameter to the process controller 40. There may be bidirectional communication with the process controller 40, so that it can receive operating commands from the process controller 40. It could be connected to the process controller 40 by a wired or wireless communication link.

The sensors can be placed in any location necessary to sense the drilling parameter being monitored. It could be mounted on a drilling rig, or downhole.

Examples of drilling parameter sensors which could be mounted on the drilling rig include sensors for monitoring the operation of the top drive, the draw works, mud pumps, pressure control equipment such as chokes or valves or blowout preventers, pipe handing equipment, iron roughnecks, separating equipment such as shakers or centrifuges, heave compensators and dynamic positioning systems. Examples of the parameters which could be measured using such sensors include the temperature of the equipment or of the fluid flowing through the equipment, the pressure of fluid flowing through equipment or conduits such as the drilling string or mud return line, the rate of flow of fluid through the equipment, the speed of rotation (RPM), for example, of the pumps, the drill string or cable storage drum, the speed of translational movement or acceleration, for example of the drill string or components in the draw works or heave compensation system, or the weight on bit (WOB).

Drilling parameter sensors can be located downhole on a bottom hole assembly (BHA) or at any location on the portion of drill string which is within the well bore being drilling. Examples of such sensors include sensors for monitoring the temperature, pressure or other characteristics of fluid in the well bore, the WOB, RPM, translational velocity and/or acceleration, and/or vibration of the drilling string, or characteristics of the formation into which the well bore is being drilled.

The equipment controller 20 may be configured to control the operation of drilling equipment such as a top drive, a hydraulic roughneck, draw works, vertical pipe handling equipment, mud pumps, pressure control equipment such as valves, chokes or blowout preventers, mud cleaning equipment such as centrifuges or shakers, heave compensation systems or dynamic positioning systems (hereinafter referred to as machines). The equipment controller 20 may be connected to more than one machine.

The drilling parameter sensors may be incorporated in a machine, or order to measure an aspect of the performance of the machine.

The equipment controller 20 may be in bidirectional communication with the process controller 40 by means of a wired, or wireless communication link, so that the equipment controller 20 may send information to the process controller 40. For example, the equipment controller 20 may report one of the following statuses to the process controller 40:
  i) ready to run,
  ii) currently running,
  iii) finished running,
  iv) state (position, grip open or closed, etc.),
  v) aborted.

The drilling automation module 30, if present, is a module which is used to enhance the control of a drilling operation, for example, by automating repetitive tasks such as tripping in a stand, running by reciprocation or carrying out a friction test. It takes operational data, maybe also information from the process controller 40, and determines what action, if any, needs to be taken in order to fulfill its particular function, and releases an operating command for one or more equipment controllers, in order to operate the drilling equipment to bring about the desired change in the drilling process. It may also send information to the process controller 40 for use by other drilling automation modules, or applications in the process controller 40.

Advantageously, the integrated well construction system comprises a plurality of equipment controllers 20. These may comprise any number and combination of the equipment controllers described above. Each equipment controller 20 may be connected to a single machine, but it is possible for one machine to be connected to more than one equipment controller 20 or an equipment controller 20 to be connected to more than one machine, or to control more than one function on one machine.

In different embodiments, the integrated well construction system includes equipment controllers 20 for a top drive, a hydraulic roughneck, draw works, a vertical pipe handler and mud pumps.

By virtue of connecting all the equipment controllers 20 to a process controller 40, if data transfer from one equipment controller 20 to another of the equipment controllers 20 is required, this can be carried out via the process controller 40. This simplifies the implementation of the drilling system, as additional communication links between equipment controllers 20 are not required, and may also reduce the total computational load on the equipment controllers 20.

As stated above, the integrated well construction system may also comprise a plurality of drilling automation modules 30. The first drilling automation module 30 may be a Configurable Automated Drilling System (CADS) which provides for the automation of tripping sequences such as moving a vertical pipe handler to the finger board to collect a pipe, moving a pipe to well center for installing in the drill string, or moving the drilling string during an automatic tripping operation, and which sends operating commands and limitations to equipment controllers relating to the draw works, top drive, hydraulic roughneck and vertical pipe handler. The second drilling automation module 30 may be a Driller's Assist module, tools which aids the driller in constructing a well bore by executing functions using and send operational limitations to the equipment controllers for the draw works, top drive and mud pumps.

The integrated well construction system may also include one or more drilling automation module 30 which does not issue any operating commands for any of the machines. These could include early kick detection (EKD) software which analyses drilling sensor inputs to determine if a kick (i.e., uncontrolled flow of formation fluid into the well bore) is likely to occur or has occurred in the well bore, Performance Analyser which carries out analyses of the efficiency or other parameters of the drilling process (see, e.g., the previously referenced WO 2018/203753) or inventory software which monitors the usage of components, such as pipes on the pip deck or finger board, in order to keep track of the remaining number of components.

One or more of the drilling automation modules 30 may be in communication, bidirectional or one-way, with one or more of the other drilling automation modules 30, thus allowing information to be exchanged between connected drilling automation modules 30, as required.

The process controller 40 may be provided with a single processor, or may be distributed over various computing elements. It may comprise a verification application which is operable to verify the of an instruction signal received from the drilling automation module 30, and to allow the instruction signal to be transmitted to the equipment controller 20 if it determines that the integrity of the instruction signal meets a required standard.

The verification application may carry out one or more of the following checks, namely that the operating command:
a) is in the correct format,
b) where it includes a value, includes a value in a pre-determined range,
c) does not include conflicting or mutually opposed instructions,
d) consists of a valid sequence of signals,
e) was transmitted via a communication link of adequate quality,
f) contains instructions to an equipment controller to which the process controller has access,
g) is issued by a drilling automation module which is approved to issue instructions to the equipment controller(s).

The verification application may, for example, have built-in algorithms to establish that the signal is in the correct format or includes values within the pre-determined range (cases a and b), or, for example, carry out a check that the drilling automation module has a digital identifier which is one of a set of pre-approved identifiers. The latter may, for example, be relevant in the case of replaceable drilling automation modules, such as if a drilling system is provided with the capability to allow third party suppliers add drilling automation modules.

If the verification application determines that the integrity of the operating command is not sound, for example, because the drilling automation module 30, or the communication link by which the drilling automation module 30 is connected to the process controller 40, is faulty, the process controller 40 blocks communication between the drilling automation module 30 and the equipment controller 20. In this example, the process controller 40 also issues a warning signal to an operator to notify an operator that there is a problem with the drilling automation module 30 and that communication between the drilling automation module 30 and the equipment controller has been blocked.

The drilling automation module 30, if necessary using data received from the drilling parameter sensor 10, generates an appropriate operating command and transmits this to the process controller 40. The operating command may be checked by the verification application, and if no problem is detected, the process controller 40 forwards the operating command to the equipment controller 20 which, in turn, controls the machines to which it is connected to carry out the desired functions. Such an automated sequence may, for example, be a number of sequential steps in a trip-in or trip-out procedure, where the drilling automation module 30 controls various functions of different machines such as pipe handling machines and a hoisting system.

The integrated well construction system is designed to be modular so that the operator may choose which drilling automation modules 30 are connected to the process controller 40, and may add or remove drilling automation modules 30 as needs change. By virtue of connecting the or each drilling automation module 30 to the equipment controller(s) 20 via the process controller 40, adding or replacing modules can be achieved without the need to make new connections or any physical or software changes to the equipment controller(s) 20 (a process which on a drilling rig in operation is costly and carries a significant risk). Moreover, a fault in one of the drilling automation modules 30 does not affect the operation of any of the equipment controllers 20. Each equipment controller 20 can continue to operate normally when instructed by one of the non-faulty drilling automation modules 30.

When a new drilling automation module is added, or a faulty drilling automation module is replaced, it is merely necessary to make the process controller 40 aware that a new module has been added, so that it knows which signals from the drilling sensors to send to the new module.

The fact that the drilling parameter sensors are connected to the process controller 40 means that the equipment controllers 20 can share data from and access to the drilling parameter sensors. As such, where more than one equipment controller 20 requires data from the same drilling sensor, it is not necessary to provide one such drilling sensor for each equipment controller 20.

The verification application provides that the operating commands sent to the equipment controllers 20 are valid, something which is particularly important when the drilling system uses third party drilling automation modules 30, or where new modules are added.

In this example, the integrated well construction system may also include an anti-collision processor (not shown) which works to avoid collision between drilling equipment, people, pipes and stationary objects on the drilling rig. This is in bidirectional communication with the process controller 40 and so may receive information or instructions from the process controller 40, and can send instructions to relevant equipment controllers 20 via the process controller 40. It is also in bidirectional communication with relevant equipment controllers, here the controllers for the hydraulic roughneck, the draw works and vertical pipe handler, and can therefore receive information or instructions directly from these equipment controllers 20 or send operating commands directly thereto.

The integrated well construction system may further include one or more external systems which is in bi-directional communication with the process controller 40, or which does not communicate directly with the process controller 40, but which is in bi-directional communication with one or more of the drilling automation modules 30.

The integrated well construction system may include a first external system which does not communicate directly with the process controller 40, but which is in bi-directional communication with one or more of the drilling automation modules 30 and, as such, can communicate with the process controller 40 via a drilling automation module 30. This can be used when the external system does not communicate on a protocol that is supported by the process controller 40, as the drilling automation module 30 can act as an interface allowing for communication between the external system and the process controller 40. By virtue of this arrangement, the process controller 40 can be used to provide an external system communicating on a protocol it does not use with access to the equipment controllers 20.

The integrated well construction system may further include a second external system, which is in bi-directional communication with the process controller 40.

Where more than one drilling automation module 30 is provided, the process controller 40 is configured to control the access of the drilling automation modules 30 to the equipment controllers 20. Before a drilling automation module 30 can control equipment functions, it must request, and be granted access to the relevant equipment controller 20 by the process controller 40. If the requested machines are available for control, the process controller 40 assigns those machines to the active drilling automation module 30. The relevant equipment controllers 20 will now be sent operating commands generated by the active drilling automation module 30.

The system may be set up so that a machine cannot be assigned to more than one drilling automation module at any one time, and so if a drilling automation module 30 issues operating commands for a machine of which it is not in control, the process controller 40 will ignore these operating commands.

To achieve this, the process controller 40 includes a priority controller which operates to prioritize the right to send operating commands and limitations to the equipment controllers 20 from the drilling automation modules 30 based on predefined prioritization rules.

For example, the prioritization rules may be that all drilling automation modules 30 have the same priority, and that access to each equipment controller 20 or each associated machine is granted on a first come, first served basis. A machine may be prevented from being controlled by another drilling automation module 30 until the active drilling automation module 30 relinquishes control.

The prioritization rules may, however, additionally state that a high priority access request can take precedence over regular operating commands. In this case, the priority controller evaluates high priority operating commands from any of the drilling automation modules 30 and can remove access to one of more of the equipment controllers 20 from the controlling drilling automation module 30 if a high priority operating command for that equipment controller 20 is received from a different drilling automation module 30.

This may be required if an event occurs in the well which requires immediate action, and that action requires control of the drilling equipment to be given to a different drilling automation module 30 to the one currently controlling the relevant drilling equipment. In this case, the reactive drilling automation module 30 concerned sends a high priority access request to the process controller 40. The priority controller assesses the request, and, in accordance with the predefined prioritization rules, gives the reactive drilling automation module 30 access to the relevant equipment controller 20, so that the operating commands required to deal with the event can be issued to the equipment controller or controllers 20.

The priority controller may also prioritize which information received from the drilling automation modules 30 is forwarded to one or more of the equipment controllers 20.

In this example, the process controller 40 also comprises a functions application in which is stored a plurality of pre-set functions which may be accessed by the drilling automation modules 30, and forwarded to the relevant equipment controller or controllers 20.

For example, for the top drive, the functions may be to extend or retract the dolly, or to rotate the top drive clockwise or counterclockwise at a particular rotational speed (RPM). For the vertical pipe handler, the functions may be to go to the finger board, to open or close grip, or to move to well center. For the draw works, the function may be to elevate to a particular height at a particular speed. For the mud pumps, the function may be to pump at a particular rotational speed (RPM) or to stop pumping. Finally, for the hydraulic roughneck, the functions may be to move to well center, to make up a joint to a particular torque, to spin in or out, to break out, or to move to a park position.

An operating command from a drilling automation module 30 may be translated by the functions application into a series of these functions, or it may comprises additional information to include into one of these functions, such as the desired speed of rotation of the pumps, or a combination of both. The functions application thus forwards an operating command received from a drilling automation module 30 to the required equipment controller 20 using these pre-set functions.

The functions application may also be used to forward operating commands issued manually by a user and sent to the process controller 40 via one of the user interfaces 50 (operator issued commands). The use of the same functions for operating commands generated by a user, and those generated by a drilling automation module 30 may simplify implementation in the equipment controllers 20 as it limits the form and number of types of instructions they can receive, and may also simplify testing of the system, as there is no need to test the same functions both for operator issued commands and automatic commands.

The verification application may communicate with the functions application to notify the functions application if it has determined that there is a problem with an operating command from any of the drilling automation modules 30. From then on, the functions application will not forward operating commands from the drilling automation module concerned to any of the equipment controllers 20. Similarly, the priority controller may communicate with the functions application, and instruct the functions application which operating command it is to forward to an equipment controller 20 in the event that two or more drilling automation modules 30 have issued conflicting operating commands for the same equipment controller 20.

The functions application may also send an operating command to an equipment controller 20 to put the connected equipment in a safe state if the equipment controller 20 has acted on an operating command issued by an automation module 30 now found by the verification application to be faulty.

The process controller 40 may further include a limitations application, which forwards limitations from the drilling automation modules 30 to the relevant equipment controller 20. The limitations set the window in which the item of drilling equipment connected to the equipment controller 20 should operate, i.e., the upper and lower limits for a drilling parameter associated with the drilling equipment. For example, the desired upper and lower limits for the rotational speed (RPM) of the top drive or torque might be sent to the equipment controller 20 associated with the top drive, the maximum pumping rate or maximum pump acceleration might be sent to the equipment controller 20 associated with the mud pumps, and the maximum/minimum position, maximum/minimum position and maximum acceleration/deceleration may be sent to the equipment controller 20 associated with the draw works.

A drilling automation module 30 does not need to request access to a machine in order to set limits to that machine. As such, by providing the process controller 40 as an interface between the drilling automation modules 30 and the equipment controllers 20 limitations set by one drilling automation module 30 may be applied to an equipment controller 20, even if that drilling automation module 30 is not active control of, i.e., actively issuing operating commands to, that equipment controller 20. If multiple limitations have been set for the same machine by different drilling automation modules 30, the strictest limitations will be applied. As such, a first drilling automation module 30 may be issuing operating commands to the equipment controller 20, but the stricter limitations set by a second drilling automation module 30 will be applied, and respected by the equipment controller 20 when following operating commands from the first drilling automation module 30, in order to provide safe and efficient operation of the drilling system.

Limitations set by the anti-collision processor can also be applied by the limitations application in the same way as limitations from the drilling automation modules 30 are set. This may assist in simplifying the testing of the drilling system, as there is no need to test the anti-collision limits and the drilling automation module set limits separately.

The limitations application provides that the limitations are applied when the equipment controllers 20 are acting on user generated operating commands. However, advantageously, an operator is provided with means to override these limitations from the driller's chair, but if a limitation is overridden by the operator whilst a sequence originating from a drilling automation module 30 is being executed, the sequence will be aborted by the drilling automation module concerned.

The verification application may communicate with the limitations application to notify the limitations application if it has determined that there is a problem with an operating command from any of the drilling automation modules 30. From then on, the limitations application will not forward limitations from the drilling automation module concerned to any of the equipment controllers 20. Similarly, the priority controller may communicate with the functions application and instruct the limitations application which limitation it is to forward to an equipment controller 20 in the event that two or more drilling automation modules 30 have issued conflicting limitations for the same equipment controller 20.

The functions application may also send an instruction to an equipment controller 20 to remove any limitations set by an automation module 30e now found by the verification application to be faulty.

The process controller 40 may also include an information application which stores information it receives from the drilling parameter sensors, the equipment controllers 20, and the drilling automation modules 30, and, where necessary, forwards this information to the equipment controllers 20 and/or drilling automation modules 30. The information application is configured to forward information to a drilling automation module 30 about a particular machine irrespective of whether that drilling automation module 30 has access to that particular machine.

Examples of such information are the measured position and speed of the draw works, the direction of rotation, measured speed and measured torque of the top drive, and for the mud pumps, the current flow and assigned pumps.

The integrated well construction system may also include a simulation application which is programmed to simulate the drilling system one or more of the items of drilling equipment so that the effect on the drilling system of an equipment controller 20 acting on particular operating command can be tested virtually before said operating command is released to the equipment controller 20.

All communication in the drilling system can be monitored by rolling counters. If the communication is interrupted for more than a defined time, the system can be set up to change to a safe state as described below.

In the event that an equipment controller 20 loses communication with the process controller 40, the action taken depends on which equipment the disconnected equipment controller 20 controls. For the mud pumps, the equipment controller 20 can be programmed to continue pumping at the current rate. Where the equipment controller 20 controls the top drive, the equipment controller 20 can be programmed to continue rotating the top drive at the current speed. For all other machines, if they lose communication with the process controller 40, they can be configured to stop executing any operating commands generated by the drilling automation modules.

If the process controller 40 loses communication with a machine, the process controller 40 notifies the drilling automation module 30 which is currently in control of the machine, and puts the other machines involved in the sequence of functions comprising the operating command currently being executed into their safe state.

The system can be arranged so that if one of the drilling automation modules 30, loses communication with the process controller 40, all the machines being controlled by that drilling automation module 30 can be put into a safe state, and the limitations application will disregard any limitations set by that drilling automation module 30.

The external system may be operatively connected to the drilling automation module(s) 30, and the drilling automation module(s) 30 be operable to set the limitations to the limitations application based at least partly on limitations provided by the external system. The connection between the drilling automation module(s) 30 and the external system may allow bi-directional communication, so that the external system is operable to receive data from at least one of the drilling parameter sensor, the drilling automation module, the process controller or the equipment controller. The limitations provided by the external system can in such a case be a function of data received by the external system from the drilling system.

In the illustrated example, the drilling system also includes an operator's interface 50 which includes a display apparatus and an input apparatus, and is in bidirectional communication with the process controller 40, so that the process controller 40 may send information to the operator's interface 50 for display, and also receive commands, or data from the operator's interface 50. The communication link between the process controller 40 and the user interface 50 may be wired or wireless.

The operator's interface may comprise a visual display apparatus such as screen with a connected input apparatus such as a keyboard, keypad or joystick, and/or a touch screen. The operator's interface 50 is, in use, typically located at the driller's chair. The warning signal may therefore comprises a visual or audible warning, or both, issued by the operator's interface 50.

In the integrated well construction system 400 as disclosed herein, the drilling control module 41 is arranged to control the drilling equipment according to the first part while repeatedly determining whether the execution of manual and/or automated tasks according to the second plan is timely executed according to the relation between execution of control of the drilling equipment according to the first plan and execution of manual and/or automated tasks according to the second plan.

The determination of whether the execution of manual and/or automated tasks according to the second plan is timely executed according to the relation between execution of control of the drilling equipment according to the first plan and execution of manual and/or automated tasks according to the second plan may comprise:
  monitoring operational data comprising at least one of state parameters from the well, a status of execution of manual and/or automated tasks and a status of drilling equipment; and
  determining whether the operational data is outside predetermined boundaries.

The drilling control module may be arranged to, when it has been determined that the execution of manual and/or automated tasks according to the second plan is not timely executed according to the relation between execution of control of the drilling equipment according to the first plan and execution of manual and/or automated tasks according to the second plan, evaluate whether any of the manual and/or automated tasks of the second part of the operational scheme should be updated, and cause the task manager module 42 to update or provide a suggested update or recommend update of manual and/or automated tasks in accordance with the evaluation.

The drilling control module 41 may be arranged to control the drilling equipment in accordance with the first part as long as it is determined that the execution of manual and/or automated tasks according to the second plan is timely executed according to the relation between execution of control of the drilling equipment according to the first plan and execution of manual and/or automated tasks according to the second plan.

The drilling control module 41 may be arranged to stop or pause or change control of the drilling equipment in accordance with the first part when it has been determined that the execution of manual and/or automated tasks according to the second plan is not timely executed according to the relation between execution of control of the drilling equipment according to the first plan and execution of manual and/or automated tasks according to the second plan. The drilling control module 41 may be arranged to resume operation according to the first part of the operational scheme when the execution of manual and/or automated tasks according to the second plan is again timely executed according to the relation between execution of control of the drilling equipment according to the first plan and execution of manual and/or automated tasks according to the second plan.

The process controller 40 may be arranged provide an alert when it is determined that the execution of manual and/or automated tasks according to the second plan is not timely executed according to the relation between execution of control of the drilling equipment according to the first plan and execution of manual and/or automated tasks according to the second plan.

As discussed above, the integrated well construction system 400 may further comprise at least one drilling automation module 30 in communication with the drilling control module and with one or more of the equipment controllers 20. The one or more of the equipment controllers is then arranged to control the operation of the drilling equipment on receipt of an operating command from the drilling automation module.

The integrated well construction system may further comprise a remote communication device, such as an electronic user device 70. The electronic user device is arranged to communicate with the process controller 70 and to display at least a subset of the manual and/or automated tasks communicated from the process controller 40. The electronic user device 70 may comprise user interaction device for user confirmation that at least one of the displayed tasks has been carried out. At least one of the manual tasks may be is associated to an operator role and wherein the subset of tasks displayed by the electronic user device corresponds to the tasks to be carried out by a determined operator role. The integrated well construction system may comprise at plurality of electronic user devices, wherein each electronic user device may be arranged to display a subset of tasks to be carried out by a determined operator role. At least one of the electronic user devices may be arranged to communicate data with an associated external device arranged to perform automated tasks.

Figure 6:
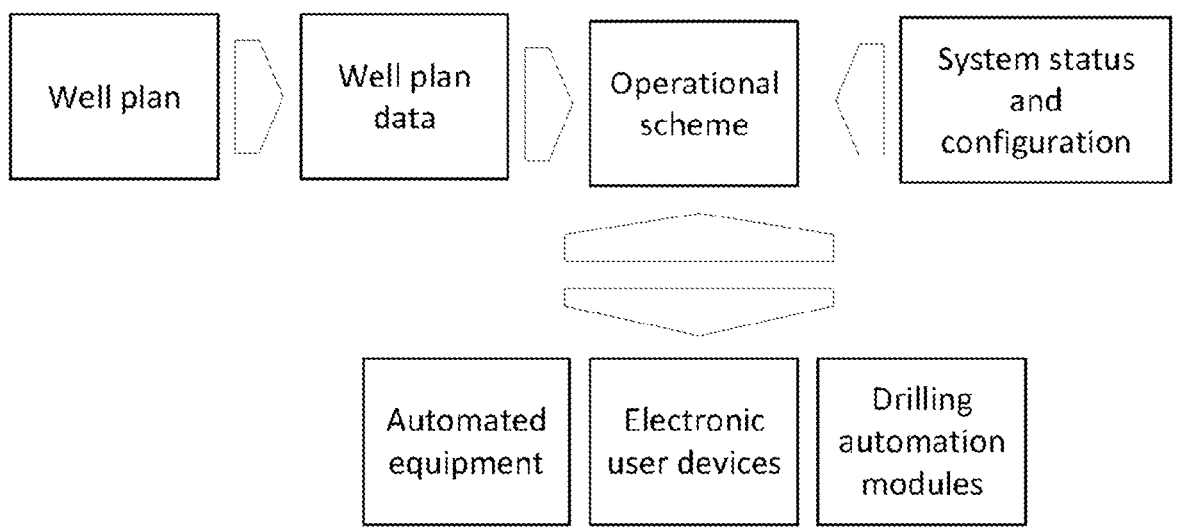
FIG. 6 illustrates generally a flow data in a system as disclosed herein.

The flow of data is illustrated in FIG. 6. A well plan is translated into well plan data. The well plan data along with information relating to system status and configuration are used for forming an operational scheme as disclosed herein. A process controller then controls drilling in accordance with operational scheme in communication with equipment controllers and/or drilling automation modules and/or electronic user devices.

Figure 7:
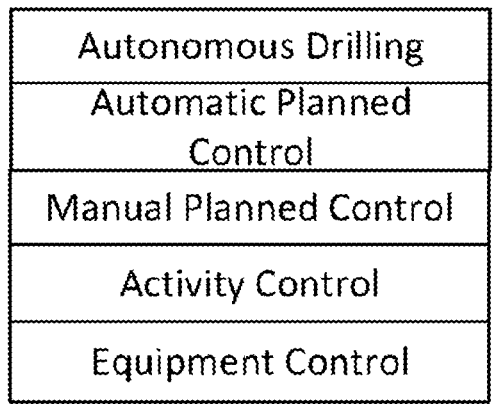
FIG. 7 is an illustration of the automation levels possible with an integrated well construction system operable for constructing a well as disclosed herein.

FIG. 7 illustrates the automation levels possible with an integrated well construction system operable for constructing a well as disclosed herein.

Equipment control is the lowest level control. Equipment control is the control of the individual function(s) of one piece of equipment. The control can be performed manually by an operator, by a manual set-up (semi-manually) wherein the operator has predefined at least some of the operation, or automatically. When control is performed automatically, this may be made by a drilling automation adapted for control of the individual piece of equipment. The drilling automation module may comprise one or a plurality of software packages. The software package(s) add value to the end user beyond the possibilities provided by equipment controllers. The respective drilling automation thus interfaces the equipment controller(s) to which it is associated. The drilling automation model may for example be adapted for:

Multi machine sequences
Well integrity
Logistic systems
Process surveillance
Planning and reporting Activity based control is for leading the operator by adapting to the activity selected. The activity selected may, for example, be:

Drilling
Pipe handling
Stand Building

Relevant drilling automation modules related to the activity is coordinated and set up using a common interface. The work of the operator is thereby simplified.

The next automation level is manual planned control. The operator can obtain or create a work plan for an operation to be done using a predefined set of sub-functions. Examples of sub-functions comprise:

Trip in a determined number of meters of a predetermined tubular dimension;
Pull off bottom using predetermined settings;
Do friction test; and
Reciprocate.

The operator is enabled to execute this plan using drilling automation modules and/or equipment controllers.

The next automation level is automatic planned control. This level involves execution of an operational scheme for drilling in accordance with a predetermined well plan.

The operational scheme comprises a set of manual and/or automated tasks, which are not possible to perform though automation but which must be done during in parallel with the automatic execution for control of drilling automation modules and/or equipment controllers. These manual operations may include at least one manual task selected from the following set:

Maintenance
Reporting
Service company tasks

The control system then supports reporting back tasks that are defined in the plan.

Exception handling during automatic planned control may be handled by using one of the lower layer controls.

The automation level is the highest automation layer. Control is performed by executing a well-plan all by itself.

Figure 8:
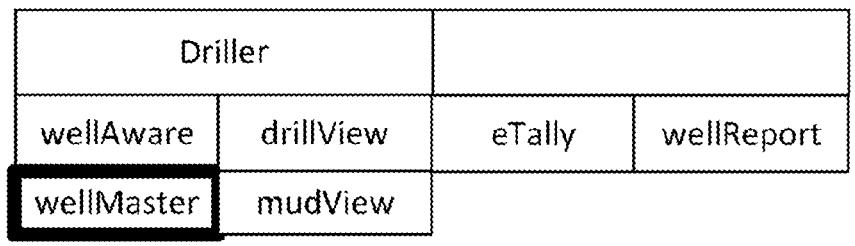
FIG. 8 is an example of a first user interface view for selecting "wellMaster" application.

FIG. 8 shows an example of a first user interface view for selecting "wellMaster" application.

Figure 9:
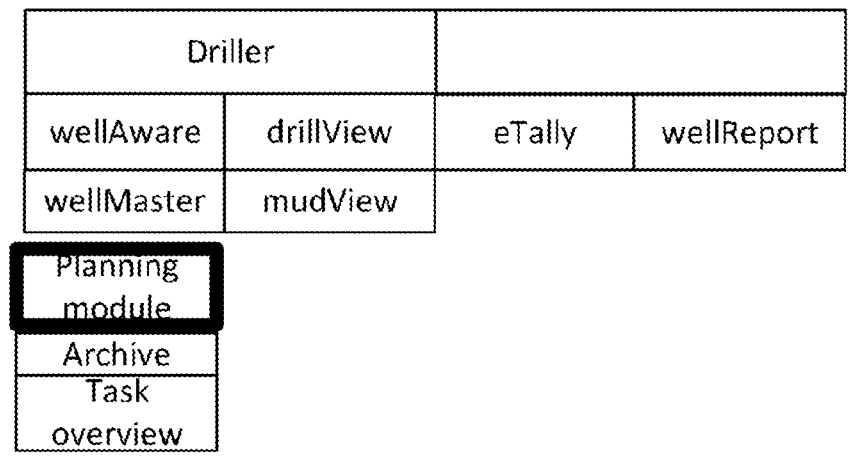
FIG. 9 is an example of a second user interface view for selecting a planning module in the "wellMaster" application.

FIG. 9 shows an example of a second user interface view wherein a planning module has been selected in the "wellMaster" application.

FIG. 10 illustrates an example of a third user interface view for initiating an integrated well construction system operable for constructing a well. The third display view is an overview view of a planning module as selected in the view illustrated in FIG. 9.

In the overview view of the planning module, a detailed plan is visualized. The detailed plan comprises a plurality of so-called Detail Operation Procedures, DOPs to be executed. In the illustrated example, the detailed plan comprises a first set of DOPs relating to a first drilling section D36. The first set of DOPs comprises a DOP1 "Drill 36 inch section", a DOP 2 "Run 30 inch conductor", a DOP 3 "cement 30 inch conductor" and DOP 4 "cut conductor". In the illustrated example, the detailed plan further comprises a second set of DOPs relating to a second drilling section D24. The second set of DOPs comprises a DOP 5 "Drill 24 inch section", a DOP 6 "Run 20 inch casing", and a DOP 7 "cement 20 inch casing". In the illustrated example, the detailed plan further comprises a third set of DOPs relating to a third drilling section D17. The third set of DOPs comprises a DOP 8 "Drill 17 inch section", and a DOP 9 "cement 17 inch casing".

In this overview view, it is visualized for each DOP whether the DOP has been confirmed and thus signed. In this planning view, the operator can sign each executed part of the DOP. Further, it is also in this view illustrated which DOPs have been completed. This DOP view thus shows the status of what has been done in each DOP. Some tasks can be performed early, so the task is ready for another user/role. Via this visualization, everyone can get a view of the current state of the DOP.

In this overview view, one of the detailed plan steps can be visualized more in detail. In the illustrated example, DOP 6 is highlighted by the operator in the left part of the view and detailed data relating to DOP 6 is visualized in the right part of the view. In the right part of the view, details relating to well information, limitations, technical data, major operational risks, other risks, critical depths etc. is visualized. The right part thus gives an overview over data relevant for DOP 6. If more details of DOP 6 are desirable, the operator activates the "Details" icon in this view.

Figure 11:
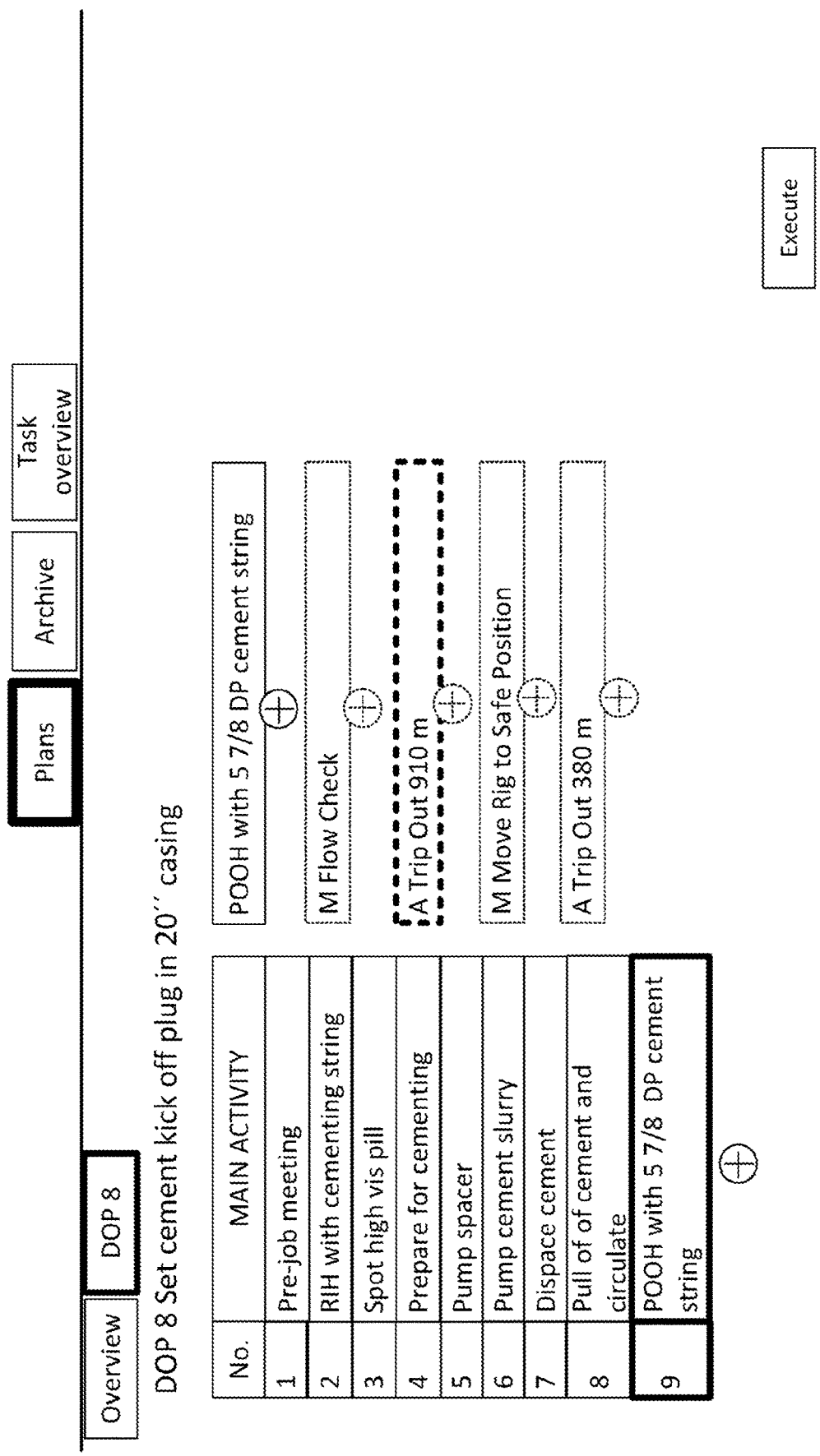
FIG. 11 is an example of a fourth user interface view for initiating an integrated well construction system operable for constructing a well.

FIG. 11 is an example of a fourth user interface view for initiating an integrated well construction system operable for constructing a well. In this user interface view, "Details" has been activated for DOP 8 of the view in FIG. 10. In this detailed plan view, the main activities of DOP 8 are visualized in the left part of this view. In this left part, one of the main activities has been highlighted. In the illustrated example, the main activity "POOH with 5⅞ DP cement string" has been highlighted (POOH stands for Pulling Out Of Hole. DP stands for Drill Pipe). On the right side in this view, the different activities associated to the main activity "POOH with 5⅞ DP cement string" are illustrated. Those activities comprise the drilling operation defined in POOH with 5⅞ DP and manual tasks and automated tasks which must be performed in association with this main activity. In the illustrated example, manual tasks which must be performed are marked with an "M". The manual tasks comprise in the illustrated example "Flow check" and "Move Rig to Safe position." In the illustrated example, automated tasks which must be performed are marked with an "A". The automated tasks comprise in the illustrated example "Trip out 910 m" and "Trip out 380 m". In the illustrated example, the automated task "Trip out 910 m" has been highlighted.

Figure 12:
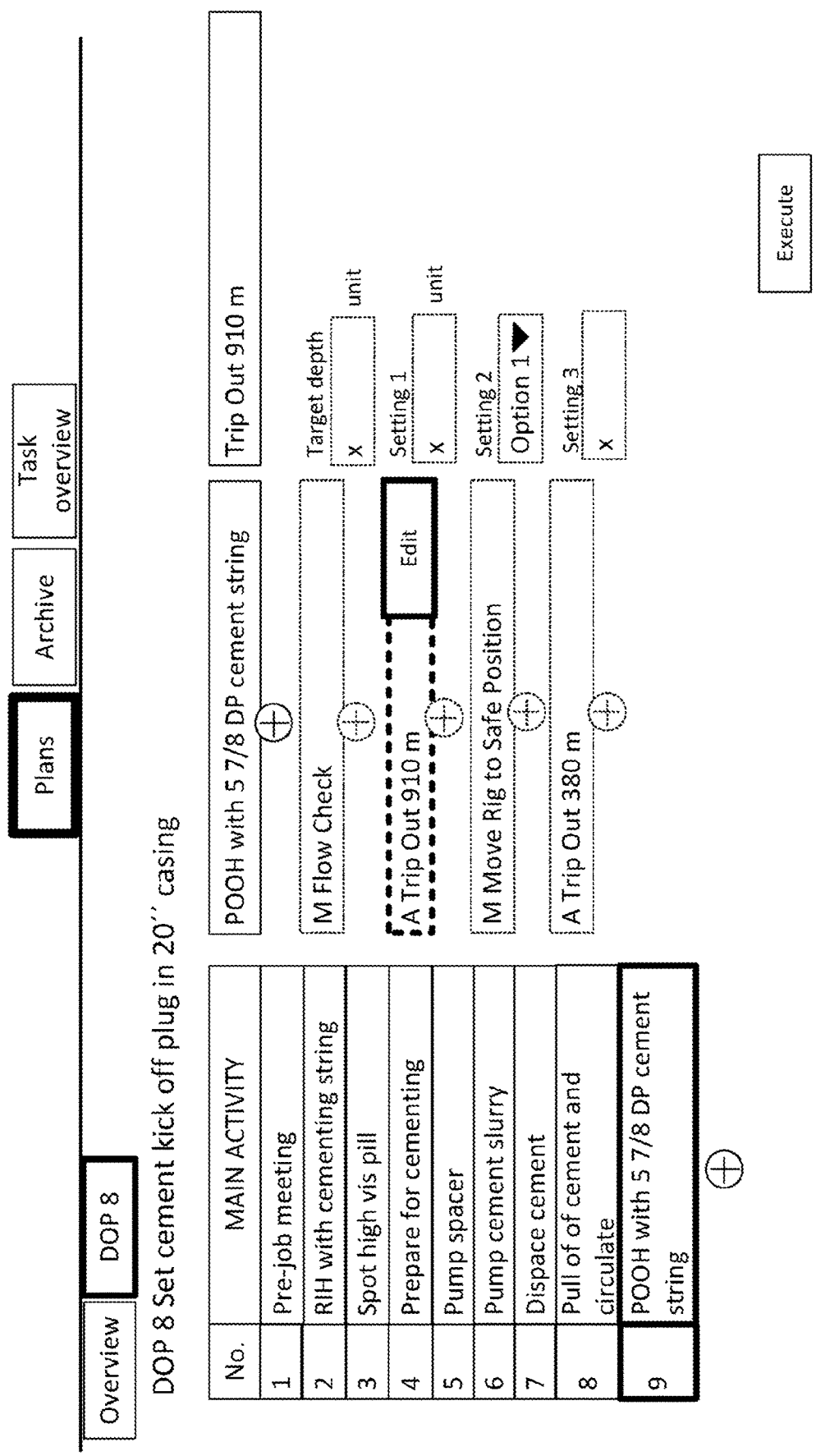
FIG. 12 is an example of a fifth user interface view for initiating an integrated well construction system operable for constructing a well.

FIG. 12 is an example of a fifth user interface view for initiating an integrated well construction system operable for constructing a well. In this view, the automated task "Trip out 910 m" highlighted in FIG. 11 has caused visualization at a right part of the view of present parameters relating to the automated task "Trip out 910 m". The present parameters may be amended by the operator. Further, the operator has in this view selected to EDIT the automated task "Trip out 910 m".

Figure 13:
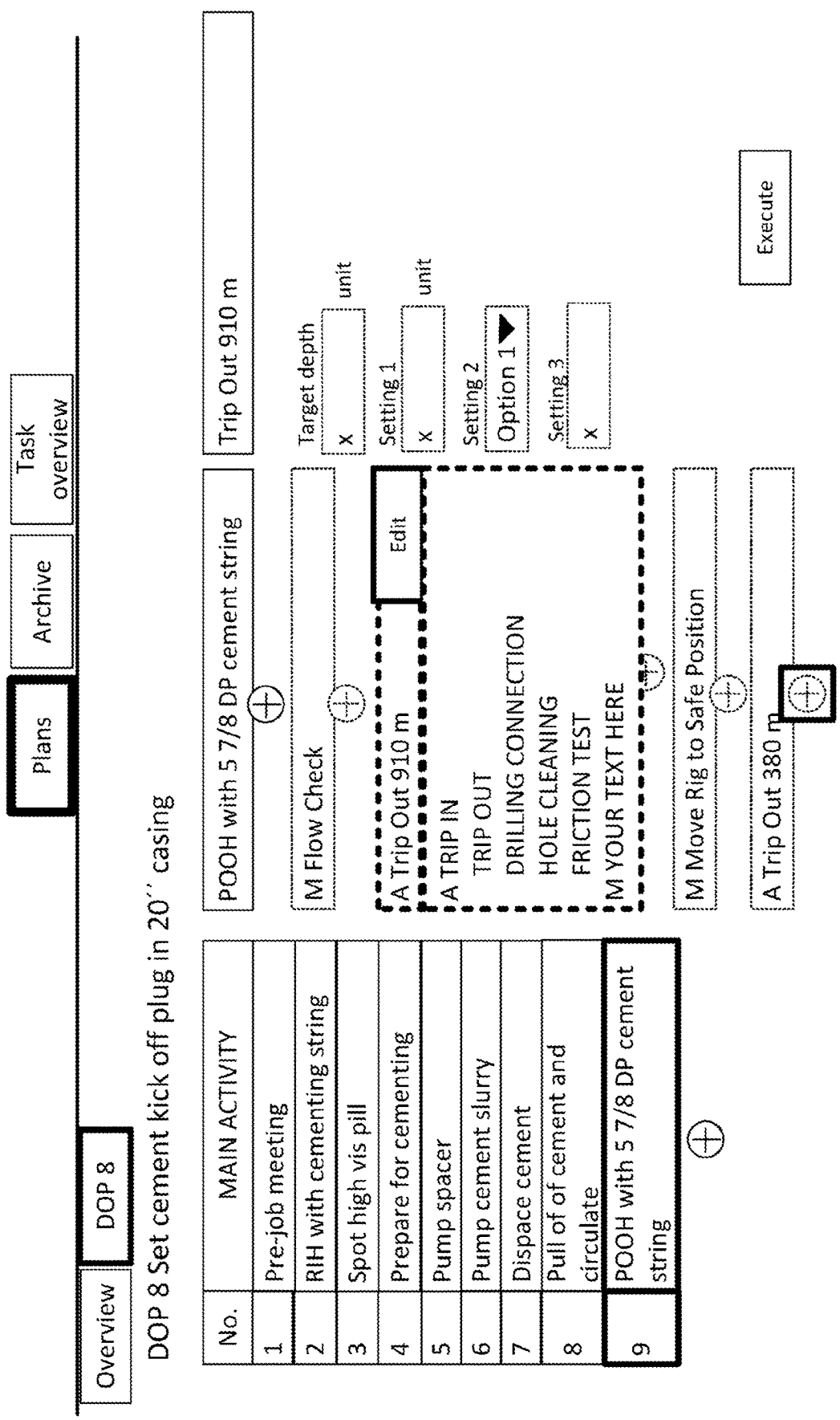
FIG. 13 is an example of a sixth user interface view for initiating an integrated well construction system operable for constructing a well.
Figure 14:
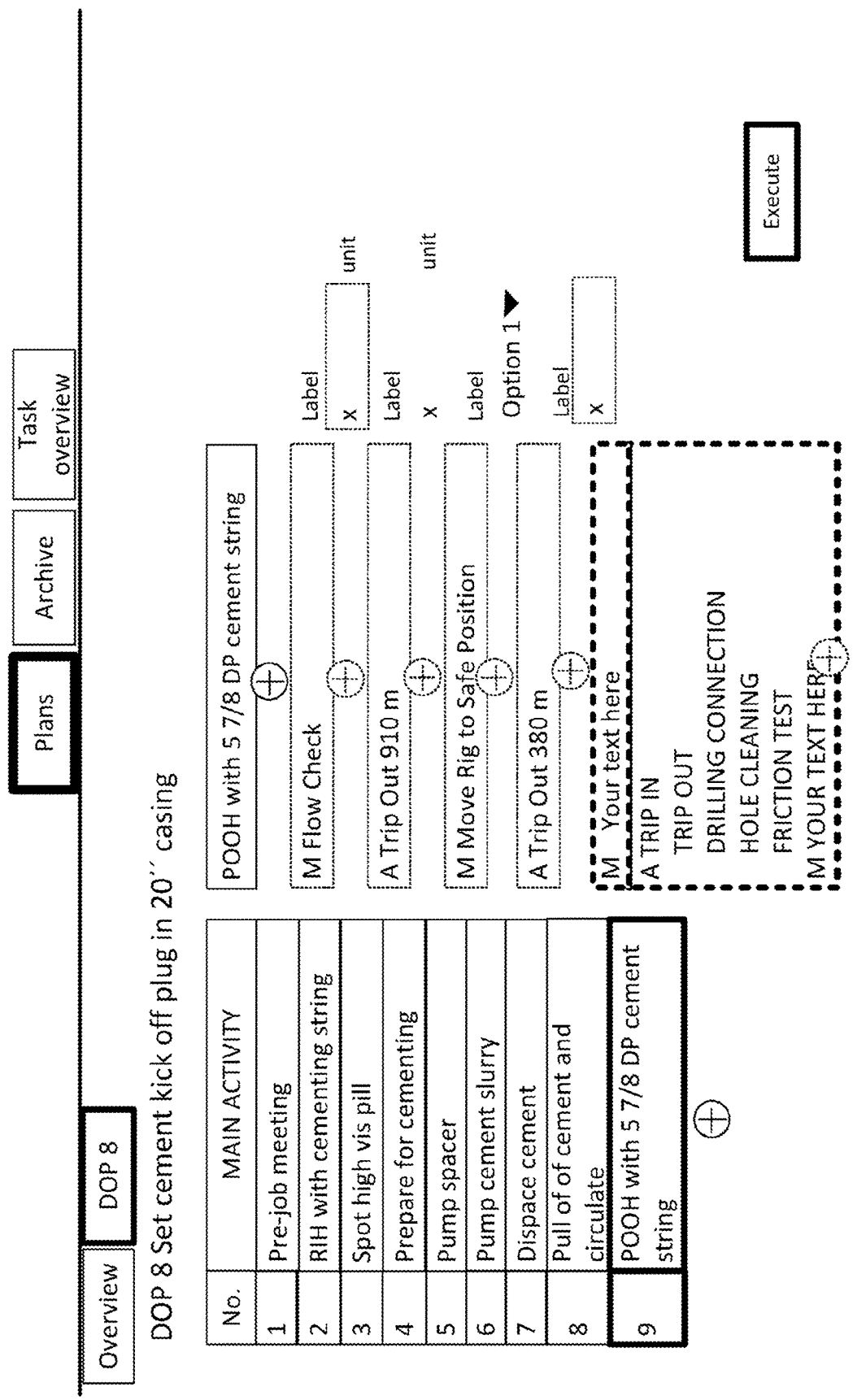
FIG. 14 is an example of a seventh user interface view for initiating an integrated well construction system operable for constructing a well.

FIG. 13 is an example of a sixth user interface view for initiating an integrated well construction system operable for constructing a well. In this user interface view, the view presented upon activation of the EDIT icon in FIG. 12 is illustrated. It is in FIG. 13 illustrated the different automated tasks associated with the automated task "Trip Out 910 m". It is in this view possible to add manual tasks to the automated tasks. Further, in this view illustrated that the automated task "Trip out 380 m" has been highlighted FIG. 14 is an example of a seventh user interface view for initiating an integrated well construction system operable for constructing a well. In this user interface view, the view presented upon highlighting of the automated task "Trip out 380 m" in FIG. 13 is illustrated. Further, in this view, the icon "Execute" has been activated to initiate this operational scheme section.

Thus, FIGS. 10-14 illustrate an example of a user interface for support in determining an operational scheme for drilling in accordance with well plan data. The formed operational scheme for drilling comprises:
 a first part for control of drilling equipment in accordance with a well-plan;
 a second part comprising automatically generated manual and/or automated tasks to be carried out; and
 a relation between execution of control of the drilling automation modules according to the first plan and execution of manual and/or automated tasks according to the second plan.

The present invention is not limited to embodiments described herein; reference should be had to the appended claims.

What is claimed is:

1. An integrated well construction system operable for constructing a well, the integrated well construction system comprising:
 a plurality of equipment controllers each of which are operable to control an operation of at least one drilling equipment; and
 a process controller which is operatively connected to the plurality of equipment controllers, the process controller comprising,
  a drilling control module which is arranged to define an operational scheme for drilling in accordance with a pre-determined well plan, the operational scheme for drilling comprising,
   a first part for control of the at least one drilling equipment,
   a second part comprising manual tasks and/or automated tasks, each of which are automatically generated, to be performed, and
   a relation between an execution of control of the at least one drilling equipment according to the first plan and an execution of the manual tasks and/or the automated tasks according to the second plan, and a task manager module comprising,
  a user interface which is arranged to visualize the manual tasks and/or the automated tasks and to receive a user input, the automated tasks being visualized,
  a task refinement component which updates the second part of the operational scheme for drilling, and
  a user interaction device which is configured to provide at least one of,
   a manual addition of new manual tasks and/or new automated tasks,
   a removal of at least one of the manual tasks and/or the automated tasks each of which are automatically generated, and
   an amendment of at least one of the manual tasks and/or the automated tasks each of which are automatically generated.

2. The integrated well construction system as recited in claim 1, wherein the drilling control module is further arranged to control the at least one drilling equipment according to the first part while repeatedly determining whether the execution of manual tasks and/or the automated tasks according to the second plan is timely executed according to the relation between the execution of the control of the at least one drilling equipment according to the first plan and the execution of the manual tasks and/or the automated tasks according to the second plan.

3. The integrated well construction system according to claim 2, wherein the repeated determination of whether the execution of the manual tasks and/or the automated tasks according to the second plan has been timely executed according to the relation between the execution of the control of the at least one drilling equipment according to the first plan and the execution of the manual tasks and/or the automated tasks according to the second plan comprises,
 monitoring operational data comprising at least one of,
  state parameters from the well,
  a status of execution of the manual tasks and/or the automated tasks, and
  a status of the at least one drilling equipment, and
 determining whether the operational data is outside predetermined boundaries.

4. The integrated well construction system according to claim 2, wherein, when it has been determined that the execution of the manual tasks and/or the automated tasks according to the second plan has not been timely executed according to the relation between the execution of the control of the at least one drilling equipment according to the first plan and the execution of the manual tasks and/or the automated tasks according to the second plan, the drilling control module is further arranged,
 to provide an evaluation as to whether any of the manual tasks and/or the automated tasks of the second part of the operational scheme for drilling should be updated, and
 to cause the task manager module to update or to provide a suggested update or a recommended update of the manual tasks and/or the automated tasks in accordance with the evaluation.

5. The integrated well construction system as recited in claim 2, wherein the drilling control module is further arranged to control the at least one drilling equipment in accordance with the first part as long as it is determined that the execution of the manual tasks and/or the automated tasks according to the second plan has been timely executed according to the relation between the execution of the control of the at least one drilling equipment according to the first plan and the execution of the manual tasks and/or the automated tasks according to the second plan.

6. The integrated well construction system as recited in claim 2, wherein,
the drilling control module is further arranged to stop or to pause or to change a control of the at least one drilling equipment in accordance with the first part when it has been determined that the execution of the manual tasks and/or the automated tasks according to the second plan has not been timely executed according to the relation between the execution of the control of the at least one drilling equipment according to the first plan and the execution of the manual tasks and/or the automated tasks according to the second plan, and
the drilling control module is arranged to resume an operation according to the first part of the operational scheme for drilling when the execution of the manual tasks and/or the automated tasks according to the second plan is again timely executed according to the relation between the execution of the control of the at least one drilling equipment according to the first plan and the execution of the manual tasks and/or the automated tasks according to the second plan.

7. The integrated well construction system as recited in claim 2, wherein the process controller is arranged provide an alert when it is determined that the execution of the manual tasks and/or the automated tasks according to the second plan has not been timely executed according to the relation between the execution of the control of the at least one drilling equipment according to the first plan and the execution of the manual tasks and/or the automated tasks according to the second plan.

8. The integrated well construction system as recited in claim 2, further comprising:
at least one drilling automation module which communicates with the drilling control module and with at least one of the plurality of equipment controllers,
wherein,
the at least one of the plurality of equipment controllers is arranged to control an operation of the at least one drilling equipment upon receipt of an operating command from the at least one drilling automation module.

9. The integrated well construction system as recited in claim 8, further comprising:
an electronic user device which is arranged to communicate with the process controller and to display at least a subset of the manual tasks and/or the automated tasks communicated from the process controller, the electronic user device comprising a user interaction device which provides a user confirmation that at least one of the at least the subset of the manual tasks and/or the automated tasks communicated from the process controller displayed has been performed.

10. The integrated well construction system as recited in claim 9, wherein,
at least one of the manual tasks is associated to an operator role, and
the at least the subset of the manual tasks and/or the automated tasks displayed by the electronic user device corresponds to tasks to be performed by a determined operator role.

11. The integrated well construction system as recited in claim 10, further comprising:
a plurality of the electronic user devices each of which is arranged to display a subset of the tasks to be performed by the determined operator role.

12. The integrated well construction system as recited in claim 1, wherein the process controller is arranged to,
obtain well plan data based on the pre-determined well plan, and
determine a status of the integrated well construction system,
wherein,
the operational scheme for drilling is determined based on the well plan data obtained and is based on the status of the integrated well construction system determined.

13. A computer-implemented method for initiating an integrated well construction system which is operable for constructing a well, the method comprising:
obtaining well plan data;
determining an operational scheme for drilling in accordance with the well plan data, the operational scheme for drilling comprising,
a first part for control of drilling equipment,
a second part comprising manual tasks and/or automated tasks, which are each automatically generated, to be performed, and
a relation between an execution of control of the drilling equipment according to the first plan and an execution of the manual tasks and/or the automated tasks according to the second plan,
visualizing, via a user interface, the manual tasks and/or the automated tasks; and
allowing for a manual task refinement, using a user interaction device, which is configured to at least one of,
manually add new manual tasks and/or new automated tasks,
manually remove at least one of the manual tasks and/or automated tasks each of which are automatically generated, and
amend of at least one of the manual tasks and/or automated tasks each of which are automatically generated,
wherein,
the user can confirm that the operational scheme is acceptable via the user interaction device.

14. The computer-implemented method as recited in claim 13, further comprising:
determining a status of the integrated well construction system,
wherein,
the operational scheme for drilling is determined based on the well plan data received and on the status of the integrated well construction system determined.

15. The computer-implemented method as recited in claim 13, further comprising:
transmitting to at least one remote electronic user device at least a subset of the manual tasks and/or the automated tasks.

16. A computer-implemented method for operating an integrated well construction system which is operable for constructing a well, the method comprising:
obtaining an operational scheme for drilling in accordance with well plan data, the operational scheme for drilling comprising,
a first part for control of drilling equipment, and
a second part comprising manual tasks and/or automated tasks, each of which are automatically generated and are manually refinable, to be performed and a relation between an execution of a control of drilling equipment according to the first plan and an execution of the manual tasks and/or the automated tasks according to the second plan; and controlling the drilling equipment in accordance with the first part while repeatedly determining whether the execution of the manual tasks and/or the automated tasks according to the second plan has been timely executed according to the relation between the execution of the control of the drilling equipment according to the first plan and the execution of manual tasks and/or the automated tasks according to the second plan.

17. The computer-implemented method according to claim 16, wherein the determination of whether the execution of the manual tasks and/or the automated tasks according to the second plan have been timely executed according to the relation between the execution of the control of the drilling equipment according to the first plan and the execution of the manual tasks and/or the automated tasks according to the second plan comprises:

monitoring operational data comprising at least one of state parameters from the well, a status of execution of the manual tasks and/or the automated tasks, and a status of the drilling equipment, and determining whether the operational data is outside pre-determined boundaries.

18. The computer implemented method as recited in claim 16, wherein, when it has been determined that the execution of the manual tasks and/or the automated tasks according to the second plan has not been timely executed according to the relation between the execution of the control of the drilling equipment according to the first plan and the execution of the manual tasks and/or the automated tasks according to the second plan, the method further comprises:

determining whether any of the manual tasks and/or the automated tasks of the second part of the operational scheme for drilling should be updated; and when it has been determined that any of the manual tasks and/or the automated tasks should be updated, updating the second part of the operational scheme for drilling.

19. The computer-implemented method as recited in claim 18, wherein the updating of the second part of the operational scheme for drilling is performed automatically.

20. The computer-implemented method as recited in claim 18, wherein the updating of the second part of the operational scheme for drilling comprises:

providing a suggested update or a recommended update of the manual tasks and/or the automated tasks; and receiving, via the user interface user, input regarding updates of the second part of the operational scheme for drilling including at least one of, new added manual tasks and/or new automated tasks, removal of at least one of the manual tasks and/or the automated tasks each of which were automatically generated, and amendment of at least one of the manual tasks and/or the automated tasks each of which were automatically generated.

21. The computer implemented method as recited in claim 16, wherein, when it has been determined that the execution of the manual tasks and/or the automated tasks according to the second plan have not been timely executed according to the relation between the execution of the control of the drilling equipment according to the first plan and the execution of the manual tasks and/or the automated tasks according to the second plan, the method further comprises:

determining whether the first part of the operational scheme for drilling should be updated; and when it has been determined that the first part of the operational scheme for drilling should be updated, updating the first part of the operational scheme for drilling.

22. The computer-implemented method as recited in claim 21, wherein the updating of the first part of the operational scheme for drilling is performed automatically.

23. The computer-implemented method as recited in claim 21, wherein the updating of the first part of the operational scheme for drilling comprises:

providing a suggested update or a recommended update of the first part; and receiving, via the user interface user, input regarding the suggested update or the recommended update of the first part of the operational scheme for drilling.

24. The computer implemented method according to any of the claims 16, further comprising:

stopping or pausing the drilling equipment or changing control of the drilling equipment when it has been determined that the execution of the manual tasks and/or the automated tasks according to the second plan has not been timely executed according to the relation between the execution of the control of the drilling equipment according to the first plan and the execution of the manual tasks and/or the automated tasks according to the second plan, wherein, an operation according to the first part of the operational scheme for drilling is resumable when the execution of the manual tasks and/or the automated tasks according to the second plan is again timely executed according to the relation between the execution of the control of the drilling equipment according to the first plan and the execution of the manual tasks and/or the automated tasks according to the second plan.

25. The computer implemented method as recited in claim 16, wherein, when it has been determined that the execution of the manual tasks and/or the automated tasks according to the second plan has not been timely executed according to the relation between the execution of the control of the drilling equipment according to the first plan and the execution of the manual tasks and/or the automated tasks according to the second plan, the method further comprises:

providing an alert to an operator.

26. A control system for an integrated well construction system which is operable for constructing a well, the control system comprising:

a drilling control module which is arranged to communicate with at least one of at least one drilling automation module and at least one drilling equipment, the drilling control module being arranged to define an operational scheme for drilling in accordance with a pre-determined well plan, the operational scheme for drilling comprising, a first part for control of at least one of the at least one drilling automation module and the at least one drilling equipment, a second part comprising manual tasks and/or automated tasks, each of which are automatically generated, to be performed, and a relation between an execution of control of the at least one drilling automation module according to the first plan and an execution of the manual tasks and/or the automated tasks according to the second plan, and a task manager module comprising a user interface which is arranged to visualize the manual tasks and/or the automated tasks and to receive a user input, the task manager module comprising a task refinement component for updating the second part of the operational scheme for drilling, wherein, the manual tasks and/or the automated tasks are visualized, the user interface allows for at least one of,
- a manual addition of new manual tasks and/or new automated tasks,
- for removal of at least one of the manual tasks and/or the automated tasks each of which were automatically generated, and
- for amendment of at least one of the manual tasks and/or the automated tasks each of which were automatically generated.

\* \* \* \* \*